US011080786B2

(12) United States Patent
Novembre

(10) Patent No.: US 11,080,786 B2
(45) Date of Patent: *Aug. 3, 2021

(54) BIDDABLE FINANCIAL INSTRUMENT, ONLINE COMPETITIVE BIDDING PLATFORM FOR TRADING THEREOF AND ASSOCIATED SYSTEM AND METHOD OF TRADING THEREOF

(71) Applicant: Clarity Markets Holdings LLC, New York, NY (US)

(72) Inventor: Robert Novembre, New York, NY (US)

(73) Assignee: Arbor Research Holdings, LLC, Barrington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,955

(22) Filed: Dec. 16, 2019

(65) Prior Publication Data

US 2020/0118211 A1    Apr. 16, 2020

Related U.S. Application Data

(63) Continuation of application No. 13/902,496, filed on May 24, 2013, now Pat. No. 10,521,859.

(Continued)

(51) Int. Cl.
*G06Q 40/04* (2012.01)
*G06Q 40/06* (2012.01)

(52) U.S. Cl.
CPC .......... *G06Q 40/04* (2013.01); *G06Q 40/06* (2013.01)

(58) Field of Classification Search
None
See application file for complete search history.

(56) References Cited

U.S. PATENT DOCUMENTS 7,574,399 B2 *   8/2009   Weber ................... G06Q 40/04
                                                 705/37
7,610,232 B2 *  10/2009   MacPherson .......... G06Q 40/06
                                                 705/36 R (Continued)

FOREIGN PATENT DOCUMENTS

JP     2002163451      6/2001
JP     2004-206470     7/2004
KR   10-2001-0074024   8/2001

OTHER PUBLICATIONS

International Searching Authority, "International Search Report and Written Opinion of the International Searching Authority," issued in connection with International Application No. PCT/US2013/042727, dated Aug. 27, 2013, 10 pages/.

*Primary Examiner* — Christopher Bridges
(74) *Attorney, Agent, or Firm* — Duane Morris LLP

(57) ABSTRACT

The present invention relates to a new type of biddable financial instrument that can be traded on an online competitive bidding process and system and method of trading thereof specifically designed to accommodate the specific needs of these new biddable financial instruments associated primarily with the introduction in the instruments core of a contractual bidder or new properties like acceleration of term linked with trading on the competitive bidding software. The inventor contemplates the use of a large number of new biddable financial instruments, for example B-VR-DOs, B-TOBs, and B-MLVRS s. The platform, system and method of trading associated thereto allows for easy portfolio management, Dutch trading, payment of interest, entry of good to cancel trade orders, priority management tools, acceleration of maturity, and offering on a secondary offering stage non-acquired positions held by the contractual bidder.

14 Claims, 11 Drawing Sheets

Related U.S. Application Data

(60) Provisional application No. 61/652,015, filed on May 25, 2012.

(56) References Cited

U.S. PATENT DOCUMENTS

| | | | | |
|---|---|---|---|---|
| 7,970,693 | B2* | 6/2011 | Hirani | G06Q 40/06 705/37 |
| 8,117,112 | B2* | 2/2012 | Hambrecht | G06Q 40/06 705/37 |
| 2002/0026400 | A1* | 2/2002 | Narayan | G06Q 40/04 705/37 |
| 2002/0099646 | A1* | 7/2002 | Agarwal | G06Q 20/10 705/37 |
| 2002/0111896 | A1* | 8/2002 | Ben-Levy | G06Q 40/00 705/37 |
| 2005/0044019 | A1* | 2/2005 | Novick | G06Q 40/02 705/35 |
| 2008/0306855 | A1* | 12/2008 | Katz | G06Q 30/08 705/37 |
| 2009/0012892 | A1* | 1/2009 | Biase | G06Q 40/04 705/37 |
| 2009/0037347 | A1* | 2/2009 | Grigsby | G06Q 30/0283 705/36 T |
| 2009/0192930 | A1 | 7/2009 | Breitenbach | |
| 2010/0088250 | A1* | 4/2010 | Magnolia | G06Q 40/04 705/36 R |
| 2011/0191230 | A1 | 8/2011 | Avery | |

* cited by examiner

| Order Type | Order Amount ($mm) | Order Level | Result | Amount Sold ($mm) | Amount Bought ($mm) | Amount Rolled ($mm) | Cumulative Sold ($mm) | Cumulative Bought ($mm) | Cumulative Bought / Rolled ($mm) |
|---|---|---|---|---|---|---|---|---|---|
| Roll | 30 | 1.150 | Rolled | :  | :  | 30 | :  | :  | 30 |
| Roll | 15 | 1.180 | Rolled | :  | :  | 15 | :  | :  | 45 |
| Buy | 15 | 1.230 | Bought | :  | 15 | :  | :  | 15 | 60 |
| Buy | 10 | 1.250 | Bought | :  | 10 | :  | :  | 25 | 70 |
| Buy | 12 | 1.280 | Bought | :  | 12 | :  | :  | 37 | 82 |
| Roll | 26 | 1.300 | Rolled | 8 | :  | 18 | 8 | 37 | 100 |
| Buy | 25 | 1.310 | Rejected | :  | :  | :  | 8 | 37 | 100 |
| Buy | 25 | 1.400 | Rejected | :  | :  | :  | 8 | 37 | 100 |
| Sell | 10 | | Sold | 10 | :  | :  | 18 | 37 | 100 |
| Sell | 19 | | Sold | 19 | :  | :  | 37 | 37 | 100 |
| Contractual Bidder: | | | | | | | | | |
| Buy | 100 | 1.400 | Rejected | :  | :  | :  | 37 | 37 | 100 |

FIG. 10

| Trading | Reports | Logout | | | | | | | | | | Welcome Mr. Bidder |

XXXXXXX
All Deals

| All Deals | | My Activity | | | | | | | | | | |

View: Daily ▼ | Reset Date: 4/4/2011 | to 4/4/2011 | Go | Current Time: 8:30:29 AM | | | | | Actions: Sell All ▼ Go |

| | | | | | | | | | | | Clarity Market Composite | | | |
| Reset Date | Issuer | Deadline | Current Rate | Security Type | Liquidity Provider | Moody's | S&P | Ceiling Rate | All Sell Rate | Opening Position | My Bids | Issue Buys | Issue Sells | Issue Holds | Projected Final Rate | New Rate | Action |
|---|---|---|---|---|---|---|---|---|---|---|---|---|---|---|---|---|---|
| 4/4/11 | XXXXXXX | 11:00 AM | 19% ← | BYRDO | Maria Trukl | -VMG 1 | AAJA-1 | 12.00% | 3.00% | 500 | | 4.000 | 2.000 | 1.340 | .526 | | Bid / Add Buy |
| 4/4/11 | XXXXXXX | 11:00 AM | 35% ↑ | BYRDO | Bank of America | AaVMG 1 | -AA-1 | 10.00% | 2.50% | | 500 | | 500 | | | | |
| 4/4/11 | XXXXXXX | 11:00 AM | 16% → | BYRDO | Bank of America | AaVMG 1 | -AA-1 | 9.50% | 1.75% | 1.250 | | | | 1.250 | .197 | | Bid / Add Buy |
| 4/4/11 | XXXXXXX | 11:00 AM | 21% ← | BTOB | Bank of America | -VMG 1 | -AA-1 | 10.00% | 2.50% | | | | | | | | |
| 4/4/11 | XXXXXXX | 11:00 AM | 17% → | BYRDO | PWC Bank | AaVMG 1 | -AA-1 | 10.00% | 2.50% | | 3.000 × | 5.000 | | 7.500 | .62 | | Bid / Add Buy |
| 4/4/11 | XXXXXXX | 11:15 AM | 17% ← | BYRDO | FHLMC | -VMG 1 | AAJA-1 | 8.75% | 1.5% | | 1.250 | 2.000 | | | .60 | | Add Buy |
| 4/4/11 | XXXXXXX | 11:00 AM | 17% → | BYRDO | Bank of America | AaVMG 1 | -AA-1 | 10.00% | 2.50% | 5.250 | | | | | | | |
| 4/4/11 | XXXXXXX | 11:30 AM | 16 ← | BTOB | JP Margae | AaVMG 1 | AAJA-1 | 11.00% | 2.50% | 1.000 | 1.000 | | | 1.000 | .15 | | Bid / Add Buy |

FIG. 11

BIDDABLE FINANCIAL INSTRUMENT, ONLINE COMPETITIVE BIDDING PLATFORM FOR TRADING THEREOF AND ASSOCIATED SYSTEM AND METHOD OF TRADING THEREOF

CROSS-REFERENCE TO RELATED APPLICATIONS

The present utility patent application is a continuation application of and claims priority from and the benefit of U.S. Non-Provisional patent application Ser. No. 13/902, 496, filed May 24, 2013, entitled, BIDDABLE FINANCIAL INSTRUMENT, ONLINE COMPETITIVE BIDDING PLATFORM FOR TRADING THEREOF AND ASSOCIATED SYSTEM AND METHOD OF TRADING THEREOF, which claims priority from and the benefit of U.S. Provisional Patent Application No. 61/652,015, filed May 25, 2012, entitled BIDDABLE VARIABLE RATE DEMAND OBLIGATION, ONLINE AUCTION PLATFORM AND SYSTEM AND METHOD FOR VARIABLE RATE DEMAND OBLIGATIONS, which are hereby incorporated herein fully by reference

FIELD OF THE INVENTION

The present invention relates to a new type of financial instrument for trade over an online auction platform designed to trade the new financial instrument, a new online auction trading platform and associated system, and a method of trading thereof, and more specifically to a new variable interest long term security such as a bond or more specifically a municipal bond for auction trading where a built-in third party intermediary is attached to the instrument to help satisfy investor sale needs. The liquidity provider of the security acts as default holder of any portion of non-allocated issue, allows for mid-period purchase over a secondary offering and the trading platform, system, and method of trading thereof.

BACKGROUND

Over the decades, there has been a multiplication of different financial instruments trading on open financial markets and over-the-counter (OTC) trading markets. Generally speaking, each financial instrument serves a unique function and resolves a specific financial need absent from the market. One of the most stable type of financial instruments is a debt inspired security called bonds. Bonds are debt obligations, most often low interest-bearing, stable and issued by large corporations, municipalities and governmental organizations as a means of generating cash for expenditures. Most retirement portfolios are made of multiple funds each a basket of bonds, stocks, or even commodities. A bond is a certificate obligating the issuing party known also as the issuer, the borrower or the seller to make regular interest payments via a trustee to the bond holder/investor and ultimately at the term/maturity of the bond pay back the principal borrowed at face value. What is described is one type of bonds, one of ordinary skill in the art will understand that different types of instruments exist each having different features and properties.

Unlike conventional loans between two fixed people, unlike commercial paper, bonds are more easily transferable over OTC exchanges. The bonds are often for large sums and investors are often broker/dealers who will trade large sums at once. One of the biggest obstacles to the free trade of bonds is the inherent complexity and opaqueness introduced via market agents operating OCT markets.

As part of the bond loan agreement, the issuer pays the holder a specified amount of interest and delays to the term refunds the principal (either fixed or variable) on a specific term date. Bonds are generally issued as a package called a single issue for a total sum and with a fix rate of interest, having a fixed maturity date in a distant future. Other bonds are offered with variable rates reset periodically. When bonds are first offered as new issues, they are introduced in what is called a 'primary market' where the money raised by banks or large brokers from the sale goes to large initial investors (buyers) to the issuer (seller) minus a commission taken by an intermediary such as a broker/dealer or a syndicate bank/dealer.

Once the primary market introduction is complete and ownership has transferred to initial investors, the single issue is then pushed to be traded either on the over-the-counter or in any one of other venues where the instruments can be traded. In fixed interest rate bonds, the initial primary issue borrower normally takes little or no financial interest in the subsequent trade on the secondary market, aside from observing the initial value given by investors. With variable interest bonds, the purchase price is left to float with demand. Some variable interest bonds have fixed value and maturity par value but the intermediate periodic rate varies. Other bonds for example are indexed and vary based on a leading indicator. Since the issuer must make periodic variable interest payments, what is preferred for the issuer is a bond that generates is traded at the lowest interest rate. A buyer or investor on the other hand desires bonds who offer the higher possible interest rate. Other important factors exist that increase the desirability of bonds, for example their long term stability, the tax exempt status of interest paid, etc.

Bonds even in a secondary market are not traded at a physical exchange the same way stocks are traded on the DOW™, or the NASDAQ™. Rather, bonds are often traded over-the-counter in trading rooms by agents of exchanges and brokerage firms. As part of the OTC process, an intermediary broker/dealer has to be contacted who will take a commission on any transaction. Delays are to be expected and fees are often charged. The mere existence of these intermediaries create a barrier to trading, an undesirable spread and will increase the costs to the seller and the returns on the buyer. What is desired is a method, system, platform, and financial instrument designed to bypasses the OTC processes while keeping the advantages associated with these bonds.

Some banks called 'market-makers' buy and sell bonds in exchange of a commission. These market-makers also use broker's-broker to help the transaction between a dealer and a dealer bank. The broker's-broker works for a stated commission while the market-maker will pocket the difference between a 'bid' price (the price bonds are sold by investors) and a 'offer' price (the price bonds are purchased by investors). The difference between the bid and the offer is a 'spread.' Ultimately, reduction of the spread is desirable in any given transaction to help investors benefit from a better offer price for any bid price thus increasing the value of a bond. The use of online trading platforms for bonds is desirable over these labor intensive exchanges.

U.S. Pat. No. 5,915,209 discloses a computerized municipal bond trading system capable of conducting a private electronic auction of bids between the central market-maker and multiple remote clients who are prospective bidders. As described in this reference, a broker compiles a list of bonds received from various traders and firms into a central listing of offering as part of a secondary market. Traders participate in silent auctions via facsimile. This system is not interactive, and the user is not allowed to search the bonds for trade. FIG. 1 is a diagram from this reference illustrating this trading system.

U.S. Pat. No. 6,161,099 discloses an apparatus and process for conducting municipal bond auctions over electronic networks. The auctioneer maintains a web site from which information about the bonds to be auctioned can be accessed, browsed and used with great difficulty. Users access the website site via a conventional internet browser after the verification of a user's identity. The system once again only serves to facilitate silent auctions. User interaction is extremely limited and searches are not really enabled.

U.S. patent application Ser. No. 12/186,501 teaches a more interactive online system where a user can select as shown at FIG. 2 between a silent auction, a direct non-competitive environment, or by-passing the automated functions through a broker to confirm trades. At FIG. 3 also taken from the same reference, the interface allows for the calculation of fees to allow users to anticipate the overall cost associated with any given trade by adding the commission component to the projected bond yield. This reference allows for the creation of trade reports, management of user history and activity, and some limited back office service for regulatory governmental institutions. The system contemplates silent auctions, and offers simplified search tools. This system allows for the trading of normal bonds and does not alter the way bonds are traded to give these bonds better long term ratings. What is needed is an interface capable of creating a trading environment where long term properties of bonds can be altered to benefit the borrower and the investors.

Some bonds, like municipal bonds are debt obligations issued by state and local governing bodies to support financing needs of these bodies. Default of states, cities, or countries is rather rare as it would result in immediate political backlash for some elected official and therefore these bonds rarely default and are rather low risk. Further, interest paid on some of the municipal bonds can be free of federal tax and, under certain circumstances, free of state and local taxes. But a low rate associated with a distant maturity date can be a significant obstacle to the sale of bonds, for example if inflation rises above the interest rate, the net benefit from holing the bonds disappears. Therefore, some bonds are designed with built in variable rates that fluctuate over time.

The Municipal Securities Rulemaking Board (MSRB) serves as the official source for municipal securities disclosures and related market data. The MSRB operates the Electronic Municipal Market Access (EMMA) system and offers an on-line centralized disclosure database of information relating to many securities. EMMA statements include on-going disclosures, escrow deposit agreements for advance refunding, real-time municipal trade price information, interest rates and auction results, and interest rate reset information for Variable Rate Demand Obligations (VRDO) together with daily statistics on trading activity and investor education materials.

VRDO are one type of financial investments and securities as contemplated in this disclosure. VRDOs are a common form of bond that pays interest based on a variable rate, that is, a rate of interest adjusted from time to time based on pre-determined conditions built in into the bond as conceived prior to the time of introduction on the primary market. Brokers help advise debt issuers as to the best conditions to build into VRDOs. VRDOs often have maturity dates far into the future (up to 30 years) but are treated as short-term investments because an investor is given a 'put' right, or the right to require that the issuer or its agent repurchase the bonds from the investor at the full face value of the VRDO at the expiry of any periodic period where the interest is reset. The put held by the owner gives holders the right to migrate away from the bonds in case of catastrophic market conditions change.

Currently, there are many different ways in which the interest rate can vary, each is spelled out in the bond documentation. In the most common form, rates are reset on a specific schedule of periodic adjustments based on best estimate of a broker-dealer or bank acting as remarketing agent reselling to investors at full face value the VRDO at the then-current rate. For other VRDOs, the rate adjustments is based on a formula pegged to a financial market rate index or other interest rate measurement. The periodic resets typically occur daily, weekly, monthly, semi-annually, annually, or even less frequently based on each bond issuance. The frequency of interest payment for variable rate bonds typically is dependent on the frequency of the periodic interest rate resets.

In 2008, the principal ARS auction market failed. As a consequence, many holders of ARS products were unable to transfer their ownership interest. Part of the reason associated with the failure is the ARS market opacity and its fragmentation. What is needed is new competitive bidding market to promote efficiency and transparency.

SUMMARY

The present invention relates to a new type of biddable financial instrument that can be traded on an online competitive bidding process and system and method of trading thereof specifically designed to accommodate the specific needs of these new biddable financial instruments associated primarily with the introduction in the instruments core of a contractual bidder or new properties like acceleration of term linked with trading on the competitive bidding software. The inventor contemplates the use of a large number of new biddable financial instruments, for example B-VRDOs, B-TOBs, and B-MLVRSs. The platform, system and method of trading associated thereto allows for easy portfolio management, Dutch trading, payment of interest, entry of good to cancel trade orders, priority management tools, acceleration of maturity, and offering on a secondary offering stage non-acquired portions held by the contractual bidder.

BRIEF DESCRIPTION OF THE DRAWINGS

Certain embodiments are shown in the drawings. However, it is understood that the present disclosure is not limited to the arrangements and instrumentality shown in the attached drawings.

FIG. 10 is an illustration of the clearing rate determination process according to an embodiment of the present disclosure.

FIG. 11 is one embodiment of a possible listing of a dashboard to help manage the transactions over the online auction platform for variable rate demand obligations.

DETAILED DESCRIPTION

Figure 1:
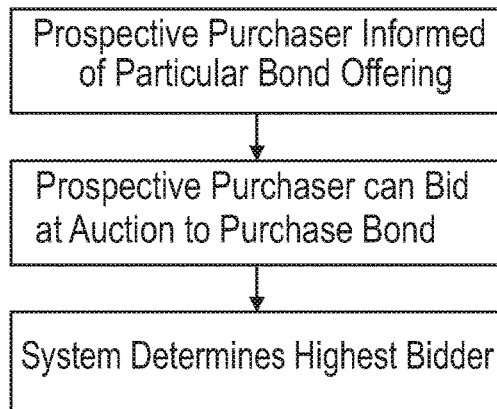
FIG. 1 an illustration from the prior art.
Figure 2:
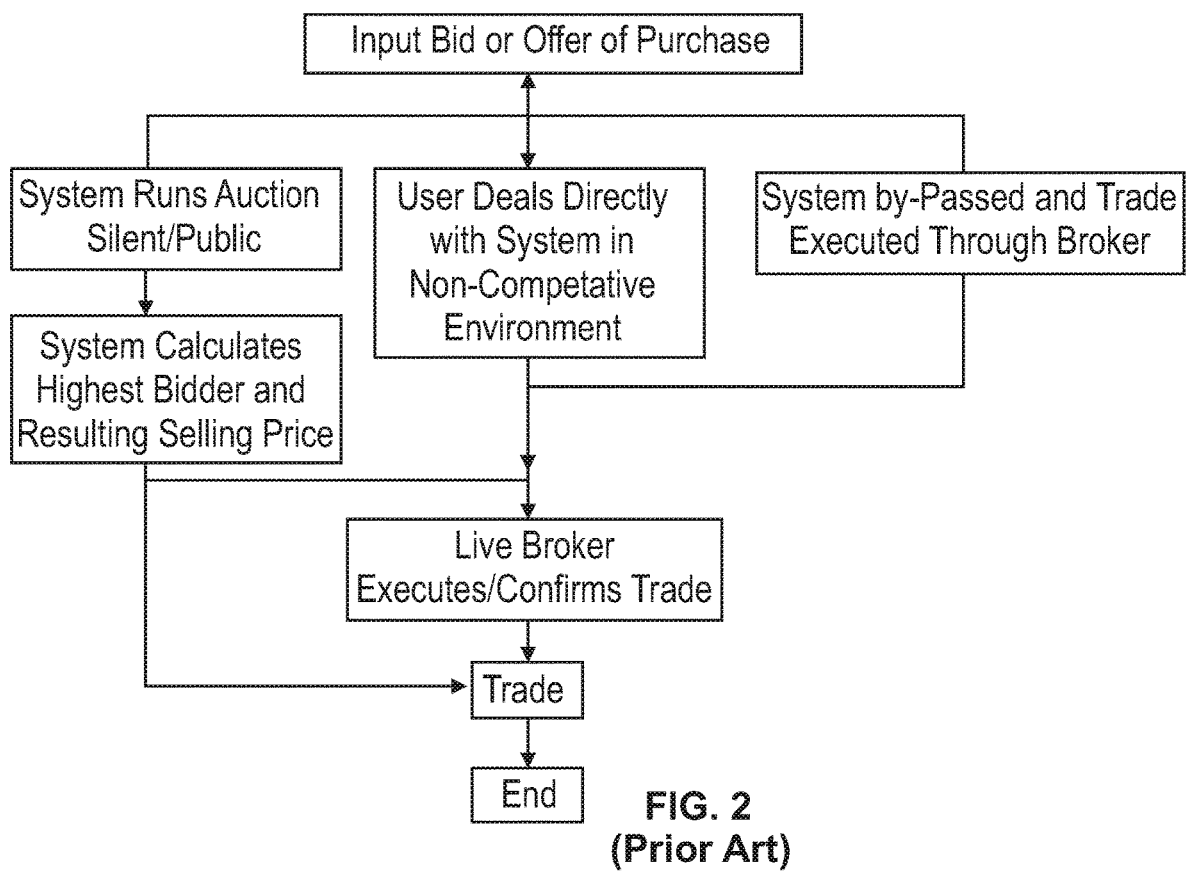
FIG. 2 is another illustration from the prior art.
Figure 3:
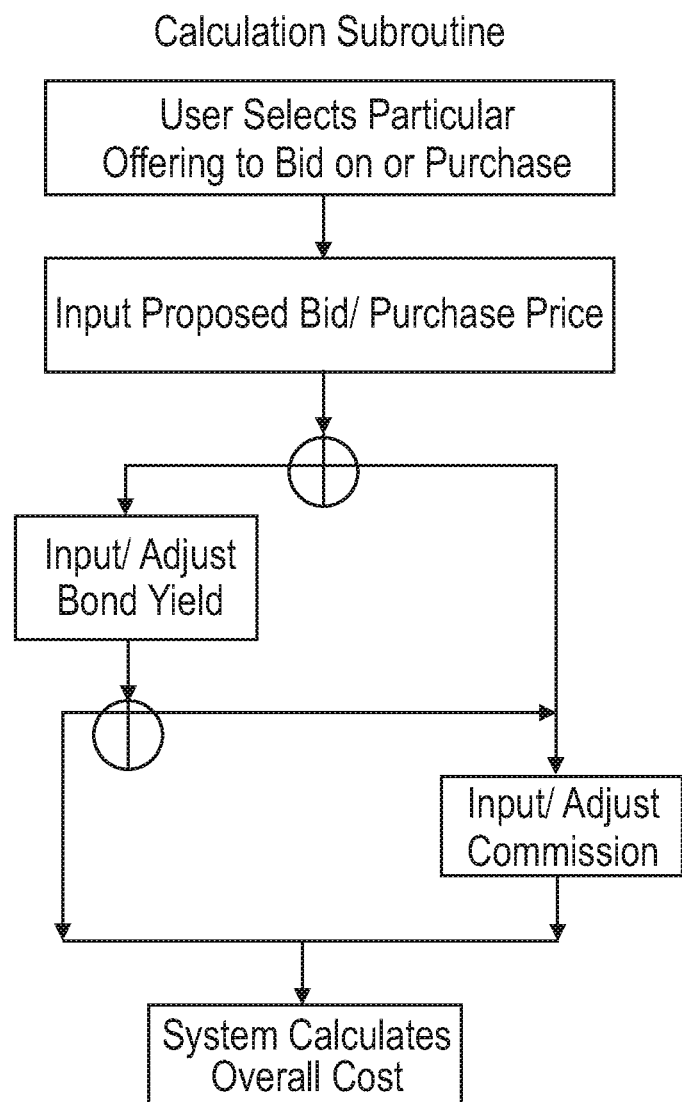
FIG. 3 is a third and final illustration from the prior art.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

In this field, different traders, bankers, or other actors routinely use different terminology or words to refer to common concepts and/or elements. Some of these terms can be synonyms or interchangeable in some cases and not in other. To help understand and define some of the key core concepts and terminology associated with this disclosure a short lexicography is offered. These terms, while offered as a guide to comprehension should not be read to limit the scope and understanding of any of the general concepts defined herein. While the competitive bidding platform is said to take biddable financial instruments, one of ordinary skill in the art will recognize that non-biddable instruments can also be traded on the platform.

Lexicography

The term "financial instrument" within the scope of this disclosure shall mean in addition to its ordinary term of art a real or virtual document representing a legal agreement involving some sort of monetary value. Some financial instruments include as equity based representing ownership interest, or deb based representing a loan made by an investor to the owner of the asset. Other types of legal agreements recognized as financial instruments include foreign exchange instruments, variable demand obligations, tender option bonds, commercial paper, optional window extension securities, market liquidity variable rate securities, sovereign bonds, corporate bonds, portfolios, and any biddable versions therefore created using the technology described herein.

The term "security" within the scope of this disclosure shall mean in addition to its ordinary meaning in the art a financial instrument that represents an ownership position in any of a plurality of interests such as a publicly traded corporation (stock), a creditor relationship with a governmental body or a corporation (bond), ownership in an option, a portfolio, etc. The term "issuer" within the scope of this disclosure shall mean in addition to its ordinary meaning in the art a company or any entity that issues a security.

The term "issue" within the scope of this disclosure shall mean in addition to its ordinary meaning in the art a series or group of stocks, bonds, or other security that is offered by the issuer generally in exchange for a fixed sum of equity or debt to be raised and held by the issuer. The term "single issue" may designate a set of bonds issued by an issuer as a group or a set.

The term "bond" within the scope of this disclosure shall mean in addition to its ordinary meaning in the art a debt investment in which an investor loans money to an entity (corporate or governmental) that borrows the funds for a defined period of time at a fixed or variable interest rate. Bonds are used by companies (corporate bonds), municipalities (municipal bonds), states (state sovereign bonds), and other governments (sovereign bonds) to finance a variety of projects and activities. Bonds are generally offered as issues where each of the different offerings are given a reference name or code for each single issue.

The term "variable rate securities (VRS)" are securities with interest rates that reset on a periodic basis. Two common types of municipal variable rate securities include auction rate securities and variable rate demand obligations with long term maturities (10+ years) and reset rates that reset on a short term basis (monthly or less).

The term "variable rate demand obligation (VRDO)" shall mean in addition to its ordinary meaning in the art a security, generally municipal for which the interest rate resets on a periodic basis and holders are able to liquidate their security through a "put" or "tender" feature at par.

The term "tender option bonds (TOB)" also known as a "put bond" or a "puttable security" is a floating rate instrument used to finance long term bond positions shall mean in addition to its ordinary meaning in the art. TOB are floating variable rate securities with put option exercisable on dates on which the floating rate changes.

The term "market liquidity VRS (MLVRS)" shall mean in addition to its ordinary meaning in the art a floating-rate debt instrument with intermediate long-term final maturity. The biddable version of these instruments defined below as B-MLVRS includes acceleration of maturity but is currently not contemplated in association with the contractual bidder.

The term "biddable" shall mean in addition to its ordinary meaning in the art the transformation of any one of a number of financial instruments using the technology described herein into a financial instrument that can be sold or traded using the below described method, on the below described system and trading platform. In cases where a new, unique financial instrument is created, the term "biddable" with a hyphen is used or the letter "B" also hyphenated is used to transform any of a number of instruments like variable demand obligations (VRDO), tender option bonds (TOB), market liquidity variable rate securities (MLVRS), into their "biddable" counterparts (e.g. B-VRDO, B-TOB, and B-MLVRS). While a handful of financial instruments or other equity, bond, option, is described, one of ordinary skill in the art will understand the technology described herein applies to any financial instrument that is not traded live and has periodic resetting features. The term biddable does not systematically mean that the financial instrument includes as part of the contractual relationship a contractual bidder but that it has the properties defined below.

The term "broker/dealer" shall mean in addition to its ordinary meaning in the art a person or firm in the business of buying and selling securities, operating as both a broker and a dealer, depending on the transaction. A dealer bank is a department of a commercial bank that engages in underwriting, trading and sale of different securities.

The term "market maker" shall mean in addition to its ordinary meaning in the art a broker/dealer firm that accepts the risk of holding a certain number of shares in a particular security in order to facilitate trading in that security. Generally, market makers receive orders and sell from its own inventory or seeks an offsetting order.

The term "underwriter" shall mean in addition to its ordinary meaning in the art a company or other entity that administers the public issuance and distribution of securities from a corporation or other issuing body. The underwriting can help determine the offering price of the securities on the Primary Market (i.e. original introduction market), and also uses the underwriter's distribution network to coordinate the single issue of between investors and equity/debt issuers.

The term "over-the-counter (OTC)" shall mean in addition to its ordinary meaning in the art the degree to a security trading in some other context than a formal exchange such as the NYSE®, TSX®, AMEX®, etc. OTC securities are often traded via a dealer network. Bonds, derivatives and other types of instruments are often traded OTC through a dealer network. Some OTC platforms include markets made by investment banks for specific and single issues.

The term "remarketing agent" is a broker/dealer agent or bank responsible for pricing of some variable-rate demand bonds in an OTC system. If bonds are tendered, the remarketing agent uses best efforts to sell tendered bonds to a different purchaser. Some known remarketing agents include Goldman Sachs®, JPMorgan®, Citigroup®, Morgan Stanley®, BAML®.

The term "alternative trading system (ATS)" shall mean in addition to its ordinary meaning in the art is a United States Securities and Exchanged (SEC) approved non-exchange trading venue specifically designed to match buyers and sellers to find counterparties for transactions, instead of trading large blocks of shares on the normal exchange. The SEC issues a set of ATS guidelines to help protect the different trading platform s programmed as ATSs.

The term "primary market/offering" shall mean in addition to its ordinary meaning in the art a first and initial issuance of a financial instrument to raise capital through the financial markets. The initial public offering (IPO) is sold as a primary offering of an issue on a primary marketplace/market. Primary markets are facilitated by underwriters and underwriting groups which consist of investment banks also known as initial placement agents. Primary markets are also known as new issue markets (NIM).

The term "secondary market/offering" shall mean in addition to its ordinary meaning in the art a market where investors purchase securities or assets from other investors, rather than from issuing companies themselves. Most national exchanges are secondary markets. In a secondary market trade, the cash proceeds go to an investor rather than the underlying company/entity directly.

The term "market agent" shall mean in addition to its ordinary meaning in the art an experience trading corporation capable of managing a trading platform, initially set up issues on the trading platform either on a platform's primary market or a platform's secondary market, maintain details of a single issue on an ongoing basis, acts as a counterparty facilitating trades between a seller and a buyer on the platform, acting as the agent in charge of reporting of trades to the different reporting entities.

The term "clearing bank/agent" also known as the authorized settlement agent shall mean in addition to its ordinary meaning in the art is a U.S. regulated broker/dealer with electronic capacity to report dealer to dealer trades to the different reporting authorities that acts as intermediary between a buyer and a seller in a transaction to reconcile orders between transacting parties. For example, a clearing bank/agent will match buy and sell orders on a market. Known clearing banks include the Industrial & Commercial Bank of China Financial Services (ICBCFS) as a prime dealer service division as a US Regulated Broker Dealer.

The term "trustee" shall mean in addition to its ordinary meaning in the art mean a person or a firm that holds or administers property or assets for the benefit of a third party. The trustee as part of a trading platform of debt manages payment of principal and interest and also manages tenders to a liquidity facility provider/contractual bidder.

The term "liquidity facility provider" in some cases described below in addition to their ordinary role can be bound as contractual bidder as a unique participant defined as part of the current invention. The contractual bidder offers a bid for the full single issue in each bidding process of a biddable financial instrument and funds any tender of the portion of the issue held. Liquidity facility providers are given tenders using the trustee and payment of principal and/or interest is also paid back to the liquidity facility provider. Some known possible liquidity facility providers also known as liquidity banks include JPMorgan®, Bank of America®, and Citigroup®. The liquidity facility provider can in some cases act as the contractual bidder in the context of this invention.

The term "bank syndicate" shall mean in addition to its ordinary meaning in the art a bank in a loan syndicate that advises other participating banks, or agent bank of advances taken and changes in interest rates for a domestic or other borrower. Within the context of primary market/introduction of an issue, an underwriting syndicate or a bank syndicate is group of underwriters who in a document called the syndicate letter solidify an agreement amongst underwriters to buy bonds from an issuer and reoffers the bonds to the public generally at a markup known as the underwriting spread.

The terms "full periodic ownership" and "partial periodic ownership" shall mean respectively the acquisition and ownership interest on the secondary market on the competitive bidding platform described hereafter of a biddable financial instrument having a variable interest rate changed periodically and where the variable interest rate is fixed for the period, and where the financial instrument is owned for either a full period or a partial period. For example, a biddable-VRDO with a weekly interest rate determination can be owned for one full week (i.e. full periodic ownership) or purchased later in the week (i.e. partial periodic ownership).

The terms "initial competitive process purchase" and "post competitive bidding purchase" shall mean respectively the acquisition on the secondary market on the trading platform described hereafter of a biddable financial instrument having a variable interest rate changed periodically and where the variable interest rate is fixed for the period and where the financial instrument is either purchased at the start of the period at the initial competitive bidding process (i.e. initial competitive bidding purchase) or is purchased during the period between two subsequent competitive bidding processes (i.e. post competitive bidding purchase).

Non Materiality of the Biddable Financial Instrument

In today's modem world most of the goods owned by individuals are slowly losing their physicality and are becoming immaterial constructs. Ownership of music was once embodied in piles of vinyl music records, then stacks of compact disks and today the owner is left with etheric rights to a library floating in the digital clouds on iTunes®. Money, credits, currency, stocks, and other important financial ownership is also migrating away from materiality. Gold bars, paper currency, or even printed versions of a stock portfolio are being replaced with a password protected access to a software connected to a database listing ownership rights.

Patent law today struggles with keeping the rights and protection of associated with the migration from materiality to non-materiality. The inventor believes strongly it owns and claims rights in the new biddable financial instrument described herein free of any materiality. Today people 'buy' a stock or 'own' a stock yet no physical element exists. The inventor hopes the rules will fully recognize and grant these rights in these new financial instruments not only as part of software, a trading platform, a system, or a method of trading using the software, the trading platform or the system.

Hardware

Figure 4:
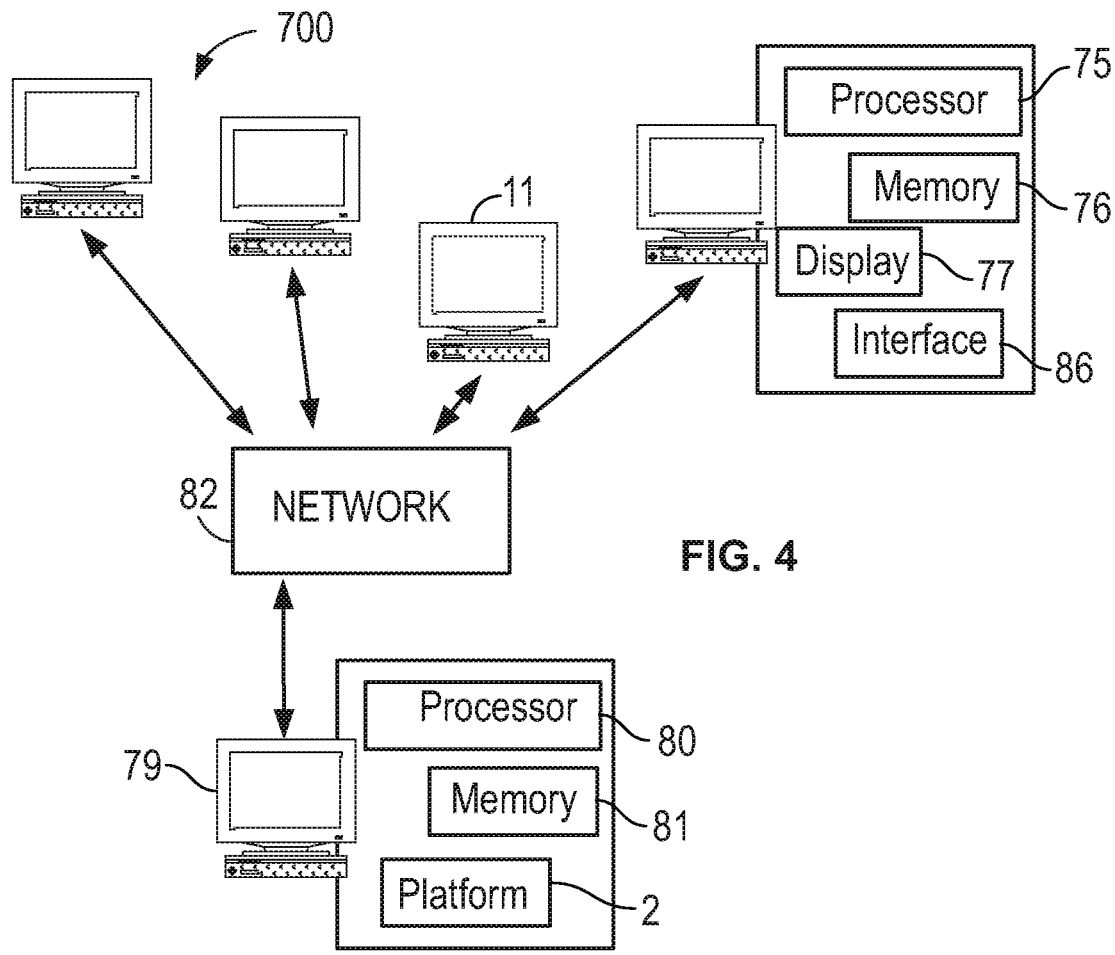
FIG. 4 illustrates the hardware elements that support an electronic online auction system accordingly to an embodiment of the present disclosure.

Since some materiality must be shown in association with the new biddable financial instrument, software designed for executing trades of financial instruments, much like banking software tools is by nature of critical importance to national order. These systems must be secure, reliable, and easy to maintain. Shown at FIG. 4 is one of numerous potential hardware configurations capable of hosting and executing the trading platform and for executing the method described herein. In its simplest and most secure configuration, FIG. 4 shows a remote server 79 or any other type of computing device connected either wirelessly, via landlines, or in any way to a network 82. A plurality of personal computers 11 such as Personal Computers (PC's), laptops, hand held devices like a tablet, a web-enabled phone, or any other web-enabled device with a computer processor 75 are in turn connected to the network 82.

Figure 5:
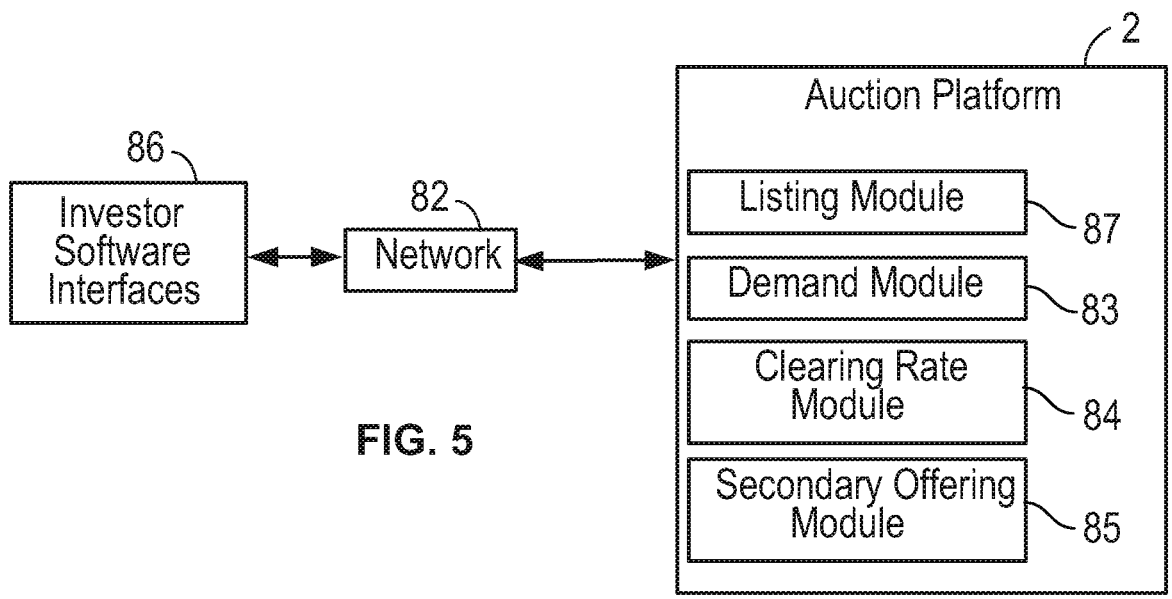
FIG. 5 is a diagrammatic representation of the software connection between the auction platform and the investor software interfaces.

The server 79 or the personal computers 11 can broadly be described as having a processor (80 and 75 respectively) each connected to a computer memory (81 and 76 respectively). While a display is generally found on the server 79 but is not absolutely needed, the personal computers 11 do in fact require some type of computer display 77 connected to the computer processor 75 for interaction with potential investors using the platform 700 hosted in the hardware shown at FIG. 4. The display 77 helps the investor (not shown) navigate over a software interface 86 as shown at FIG. 5 to display different information in the computer memory 76 by the computer processor 75 over the interface 78.

Within the scope of this disclosure, the term computer display 77 includes more than a screen or other visual interface, the term display is designed to include any interface capable of interacting with an investor, whether visual, oral, touch, or any other interface. A personal computer 11 also includes running as part of the memory 76 and displayed on the computer display 77 an investor interface 86 and is connected to the computer processor 75. In one embodiment, the processor 75 executes an operating system (not shown) and an associated HTML web-enabled browser (not shown) capable of displaying to an investor using an auction platform 2 residing on a network enabled server 79 connected to a network 82 like the World Wide Web also called commonly 'the Internet.' The term network is used as part of this disclosure and encompasses broadly any type of computer network, over hardware, software, or wireless such as for example a Local Area Network (LAN), or any other network where the platform can be found to trade biddable financial instruments, like for example B-VRDOs in a secure environment.

The auction platform 700 also includes a network enabled server 79 includes for example a server processor 80 with a server memory 81 for executing a competitive bidding platform 2. As shown at FIG. 5, the competitive bidding platform 2 can be connected to the investor software interfaces 86 for each of the plurality of personal computers 11 via the network 82. These computers in association with wireless networks, physical networks, for operating software to help give material form to the new biddable financial instruments are systems for trading the biddable financial instruments. These systems, platforms, and software and their associated functions are described hereafter.

Today the concept of software operating within hardware is migrating away from this fixed structure. Cloud computer and data storage allows multiple interconnected hardware elements like cell phones, wireless tablets, portable computers, and even onboard memories to act as part of larger data structures and systems. While one hardware configuration is shown as the current preferred embodiment, one of ordinary skill will recognize that with time, there will be a migration away from these simple structures. For example, new software platforms may allow the different actors to retain locally control over some issue. The following technology is not limited to one hardware configuration.

Biddable Financial Investments

Figure 6:
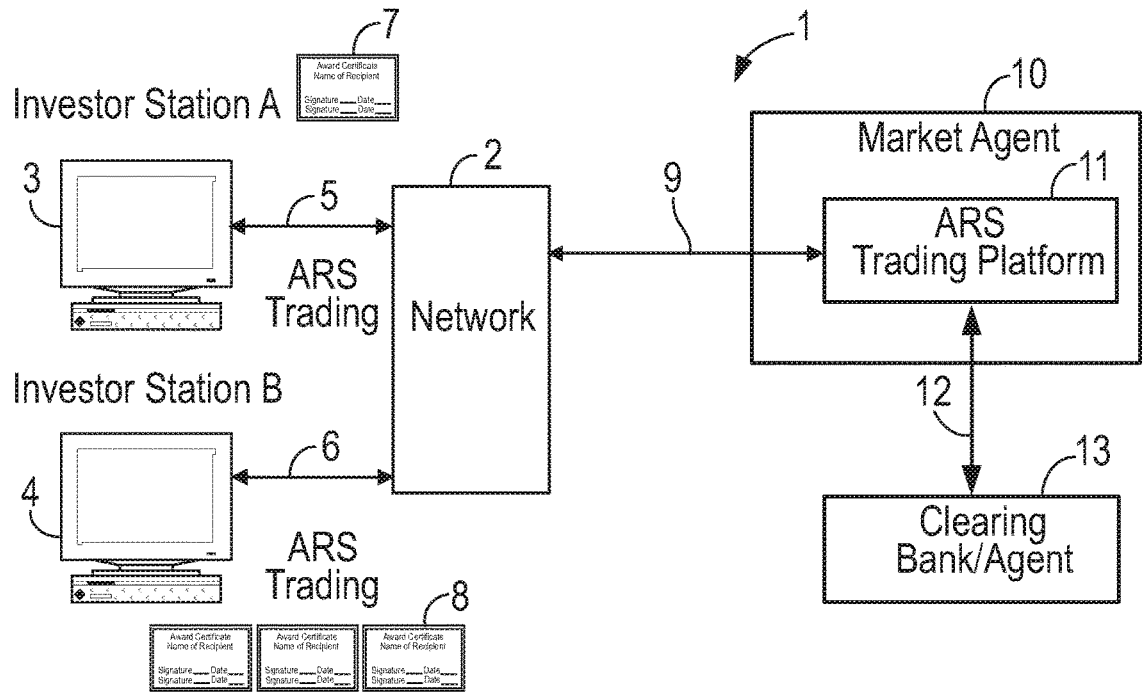
FIG. 6 is a schematic representation of the online competitive bidding platform for ARS as known in the prior art.

Before we can understand the importance and novelty of the new biddable financial investments we must note that they are created and designed for use on the new biddable online trading platform and associated system, we must clearly understand the limitations imposed upon the current online trading auction system for trading Auction Rate Securities (ARS). As shown at FIG. 6, ARS are debt instruments (corporate and/or municipal bonds) created by an underwriter and a bank syndicate for initial primary market introduction as many normal issue. On FIG. 6, the total single issue is illustrated by four certificates 7 and 8. In the example of FIG. 6, the broker/dealer also known as investor A at investor station A holds ¼ of the single issue 7. The broker/dealer also known as investor B at investor station B holds ¾ of the single issue 8.

ARS are auctioned every 7, 28, or 35 days and the interest paid is given at the end of each auction period while the principal is due to the bearer at the maturity date. In theory, the interest rate of the ARS will float under market forces. In ARS systems 1, it is possible that multiple stations A, B (numbered 3, 4) are connected using software and a network connection 5, 6, to a secured internal or external network 2 and then connected 9 to an ARS trading platform 11 either managed by a market agent 10 or by any number of interested party. To help manage the flow of money and trades, a clearing bank/agent 13 is introduced into the equation 12.

There is no contractual obligation for the market agent 10 or the clearing bank/agent 13 to interfere in the trading process aside from regulation of flow. The ARS structure in itself allows for periodic recalculation and redetermination of the interest rate, not much more. In case of lack of interest in the ARS, interest rates settled will rise as the single issue is auctioned for lack of buyer. In 2008, ARS auction markets failed when banks acting as brokers declined to act as bidders of last resort. These platforms were opaque and fragmented and therefore they were no longer favored.

Figure 7:
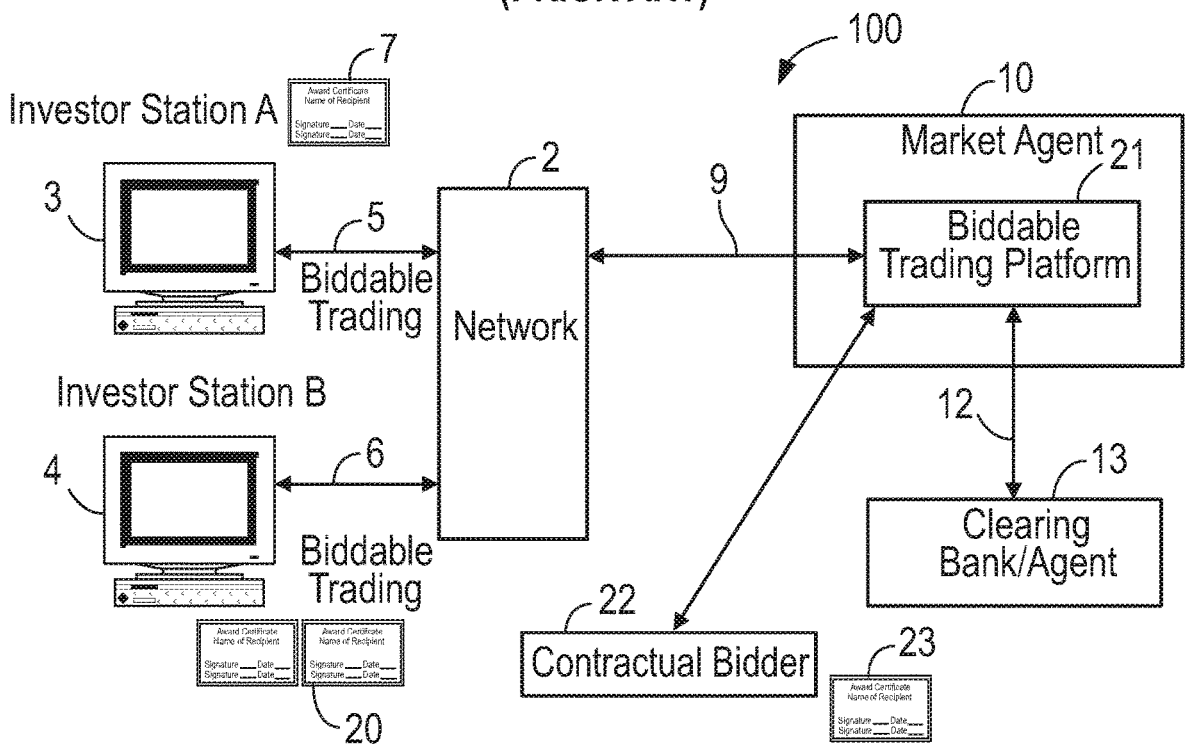
FIG. 7 is a schematic representation of the new online competitive bidding trading platform for biddable financial instruments according to an embodiment of the present disclosure.

The new biddable financial instruments on the new competitive bidding online platform 100 as shown at FIG. 6 contemplated herein are different financial instruments, in one embodiment the financial instrument is a VRDOs that are not traded OTC but are created with a contractual relationship that binds a liquidity provide 22 called a contractual bidder as shown at FIG. 7 to an issue based on the below defined relationships In essence, for each bidding period, in addition to the two investor stations A and B (numbered 3, 4) still connected to a trading platform 22 for trading biddable instruments and owning portions of the issue 7, 20, what is contemplated is the use of the contractual bidder 22 as a third party engaged in the bidding on the biddable trading platform 21 at a determined level and who can, in certain conditions owned part of the issue as shown at 23. Illustratively, FIG. 7 shows a situation where investor A owns ¼ of the single issue 7, investor B owns ½ of the single issue 20, and the contractual bidder 22 owns ¼ of the single issue 23. The clearing agent 13 and the market agent 10 remain as intermediary to provide the facility to trade and the clearing agent 13 services to clear each trade but must manage the different trades and bids of the new liquidity provider 22 and must manage separately the portion of the single issue 23 held by the liquidity provider 22.

The inventor has defined in the new biddable financial instruments the role of the liquidity provider 22 also called 'contractual bidder' built in directly as a condition. The new online competitive bidding platform for trading these new biddable financial instruments and also as described above new financial instruments can be in some cases uniquely created to take specific needs of the existence of the contractual bidder 22 as part of the relationship. Finally, what is described herein is the use of these instruments binding the contractual bidder 22 as part of a system or the method of use and/or trade of these instruments over the platform. By trading on a biddable online trading platform products that normally are offered on OTC, the need of a remarketing agent is bypassed, saving time and commissions.

Financial instruments are designed to unite two parties to their mutual benefit. They are created through a contractual agreement that unites them and informs third parties who will handle the instruments the precise conditions of the relationship. Some of these contractual agreements are created to allow one or more variable, such as the interest rate to fluctuate over time at precise time increments (i.e. periodically). Securities contractual agreements generally contains the following: (a) a price to be paid to the third party including premiums or discounts, (b) certain terms like interest rates, maturities, redemption provisions, acceleration provisions, and original issue discount, (c) circumstances under which the third party may cancel obligations to purchase the issue, (d) the different good faith deposits or transfers of funds, (e) the conditions at closing with documents, certificates, and opinions, and (f) restrictions on the liability of the issuer.

The relationship described in the new biddable financial instruments is an agreement binding in some cases (B-VRDO & B-TOB) a third party, namely the liquidity provider into the normally bilateral relationship between the issuer and the buyer/investor and called the contractual bidder. Because of the nature of certain of variable rate instruments and the size of the minimum fraction of issues to be purchased, one of ordinary skill in the art will understand that in addition to ordinary investors, portfolio managers for corporations, broker/dealers may act as potential acquirer.

The biddable financial instrument is a new type of financial instrument having different terms on its contract and agreement directed to the different conditions listed as (b) above for trading of these instruments.

One of the important concepts described herein that can be applied to some of the biddable financial instruments, like the B-MLVRS is the concept of "acceleration" found in many of the contracts and agreements forming the different financial instruments. "Acceleration" is defined as a remedy provided in many security agreements, including many indentures and bond resolutions by which a trustee may declare all future payments of principal immediately due and payable after the occurrence of certain specified events, usually called events of default.

In some security agreements, the issuer may be required to accelerate the financial agreement upon the occurrence of an event of default. Sometimes acceleration can occur upon the consent or direction of a credit enhancement provider or only upon the request of the holders of a specified percentage of the bonds, such as 25%. Unless a security agreement provides otherwise, acceleration results in available monies being used first to pay interest pro rata on all the bonds and, if interest is fully paid, to pay principal pro rata on all maturities. In some cases, when a bond goes to a liquidity provider who in turn holds it for a specific period of time, the bond can be known as a bank bond.

The inventor of the current disclosure has found that as part of a periodically traded financial instrument, such as a VRDO, or a B-VRDO (a biddable VRDO), if the issue is offered in any given period to investors and portions of the issue are not grabbed and either the totality or even a portion of the issue remains available for purchase or trade on any market, then default conditions for acceleration can be initiated.

The online competitive bidding platform allows the market to directly signal clear value of liquidity bank's 'name in market', allows for electronic data collection to improve opportunity risk management, standardize and electronically manage the tender notification process through the biddable platform, offer an accurate and immediate reflection of the market sentiment to issuers, and a pre-determined schedule of contractual bidder bid rates provides a clear and known relative rate earned if and when holding bonds.

Biddable Financial Instrument Maturity Acceleration

In one contemplated embodiment, a biddable financial instrument like a B-MLVRS can be set up with a maturity date of 30 years can be accelerated, for example, to a maturity of 9 years if on the competitive bidding platform on which the instrument is traded, a market liquidity failure mode (i.e. a failure to find takers on of the full issuance at the time of determination of the yield resulting in the use of a failure rate to be selected) of 12 consecutive months have prevailed. In the above example, this would be embodied by the liquidity provider being in a position where it owns at least a fraction of the single issue for this period.

In another contemplated embodiment, the contract or agreement of the instrument can include conditions of accelerations (e.g. 30 to 9 years) but also conditions of deceleration, for example to return the instrument from its accelerated maturity of 9 years back to its initial maturity of 30 years if subsequent conditions are met. For example, if a single issue failed to find full takers for 12 months (i.e. 12 consecutive monthly periods, 52 weekly periods, etc.) and was accelerated from 30 years down to 9 years but as it continues trading finds takers of the entire issue of the single issue for a new period, for example 12 continuous months, the instrument can be, under the contract returned to a maturity of 30 years. In another embodiment, once the liquidity provider has held a portion of the single issue for six months, these bonds can be converted to bank bonds and given new CUSIPs and maturity acceleration will commence.

Market Flow on Biddable Financial Instruments

Figure 8:
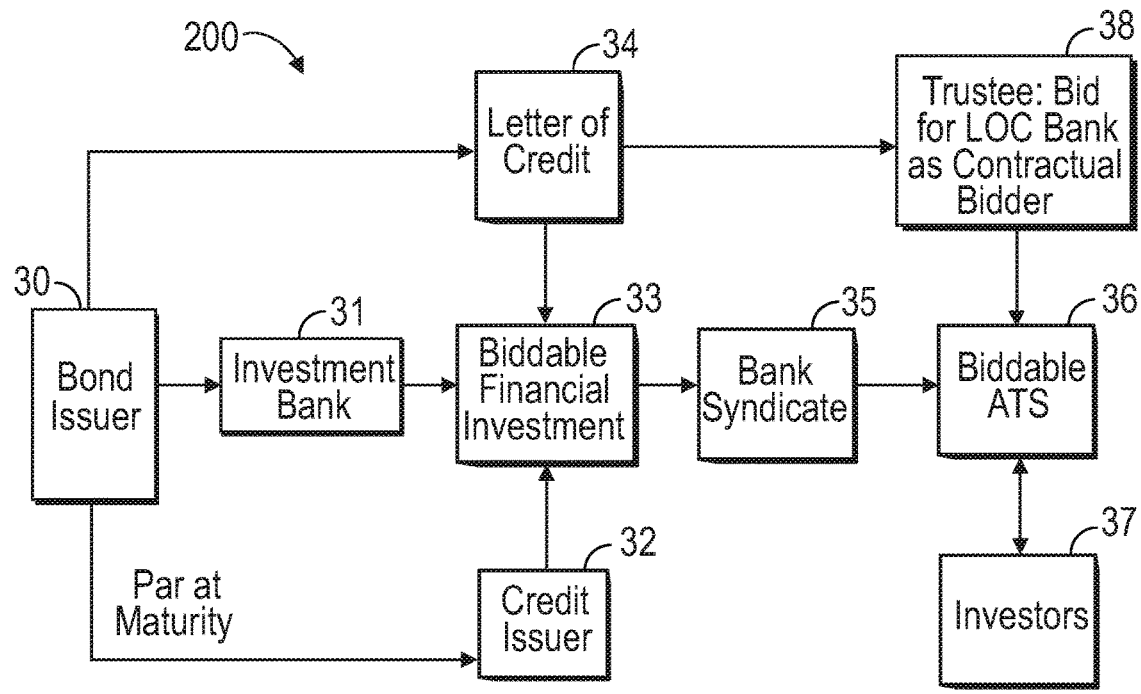
FIG. 8 is a block diagram of the steps associated with the market flow at the creation of the biddable financial instruments and their use on the biddable ATS according to an embodiment of the present disclosure.

As is the case for each new financial instrument introduced in the market, multiple actors are needed to create the relationship agreement between the different parties. In the case of the new biddable financial instrument, a liquidity provider/contractual bidder 38 as shown at FIG. 8 is added to the equation. Once these financial instruments are created, they are placed on the online competitive bidding platform described materially and in software at FIGS. 4-5, and functionally as part of an ATS at FIG. 7. FIG. 8 shows from left to right the market flows 200 associated with the introduction in a primary market of a biddable financial instrument in the biddable-ATS 36 in which investors 37 will then exchange any portion of a single issue alongside a contractual bidder 38. In this case, using the letter of credit 34 obtained from a bank the trustee sets up under bid a letter of credit bank to be the contractual bidder 38. One or numerous investment banks 31 help the bond issuer 30 create the biddable financial investment 33 for introduction via a bank syndicate 35 to the biddable ATS 36. Once set up, the relationship is between elements 36, 37, and 38 in FIG. 8. These new markets as shown at FIG. 5 allows for better efficiency, price determination, access and understanding of the trade of instruments. While some of the biddable financial instruments are attached to a contractual bidder, others are not.

Primary v. Secondary Offering

Figure 9:
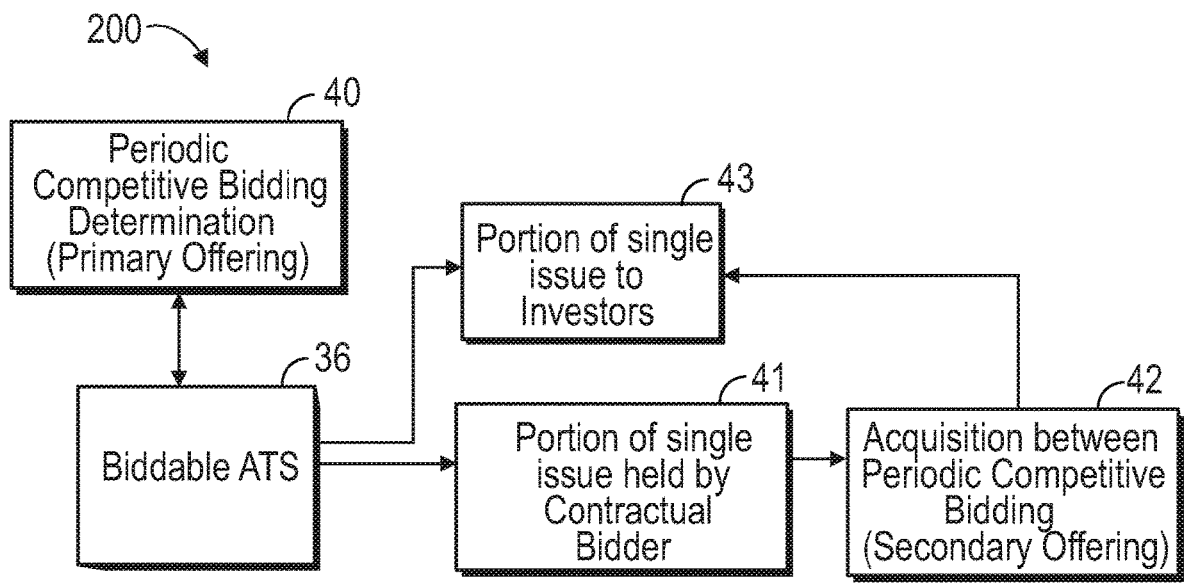
FIG. 9 is a block diagram illustrating how an investor may acquire portions of the single issue of the single issue from the biddable ATS at a primary offering or a secondary offering according to an embodiment of the present disclosure.

FIG. 9 shows the dynamic associated with having a contractual bidder 41 required to bid and ultimately acquirer a portion of a single issue during the primary offering at one of numerous periodic auction determinations 40 of a biddable ATS for trading some of the biddable financial instruments described herein. Since the object is to promote a two way transaction between the investors and the bond issuer, the holding by investors of the largest portion of the single issue possible is preferred instead of allowing the contractual bidder for holding a portion of the single issue. Between periodic bidding periods 40, investors may want to acquire the portion held by the contractual bidder 41 will be given access as part of a secondary offering 42 on the biddable software platform.

Example 2

On Jun. 14, 2016 at a monthly periodic auction of CUSIP-6 single issue #99000A is at primary offering. After a clearing rate of 1.31% is calculated, 50% of the single issue is given to the different investors and 50% of the single issue does not find takers for lack of bids and is given to the contractual bidder at a higher rate as defined. Generally, contractual bidders under this model receive a higher rate to compensate for acting in the transaction as intermediary. The 50% held by the contractual bidder is then placed on a secondary offering on the biddable ATS 36 where it can be acquired by other or the same investors 43 at the clearing rate.

Clearing Rate Calculation

To understand how the clearing rate is calculated by the biddable ATS also known as online competitive bidding platform, bond issuers desire to sell the single issue at the lowest possible interest rate and therefore the software system will find a bid from a potential buyer/investor with the lowest possible interest to be a high value bid. Lower value bids are defined as buy orders for other portions of the single issue at a higher interest rate. By definition, an investor who places a buy order at a lower rate, will be pleasantly surprised if the clearing rate calculated by the platform and biddable ATS to be higher (i.e. a buy order of 10% of a single issue at 1.5% can be satisfied by a grant of 10% at 1.6%). Under the Dutch auction model, it would be unfair to penalize the bidder who offered the lowest rate (and most valuable to the issuer) so therefore these bids are ranked higher and processed first based on the most valuable bids. As part of the entry of bids, specified levels can be entered into the biddable online auction platform as a specified rate, a spread to a benchmark (e.g. SIFMA®), or a percentage of a benchmark (e.g. LIBOR®). The clearing market in another embodiment will allocate bonds to the new holders based on a priority of (a) roll orders at the clearing market rate, (b) buy orders at the clearing market rate, and (c) buy orders of the contractual bidder.

Example 3

In the table below, a single issue of a B-VRDO CUSIP-6 single issue #99000A is $100 million is to reset at a periodic time increment of 7 days. Under the agreement, the a ceiling rate is 9%. As illustrated in the table below, two sellers want to let go their current positions (seller 1 and seller 2) totaling 29% of the single issue. Three sellers holding the remaining 71% of the single issue may want to keep their positions (called a roll) but at a specified rate or market clearing rate (roll 1, roll 2, and roll 3). In addition to the sell orders and the roll orders, two new buyers in this case placed bids (buy 1, and buy 2). For each roll order, a different rate and volume is entered. As part of the agreement of the new biddable financial instrument, the contractual bidder (LF) is required contractually to place a buy order for the entire issue size ($100 million) at market rate (i.e. the clearing rate).

| 100 MILLION ISSUE | | |
|---|---|---|
| | Sales | Total: 29 million |
| Seller 1 | 10 million | |
| Seller 2 | 19 million | |
| | Roll Positions | Total: 71 million |
| Roll 1 | 30 million at market rate | |
| Roll 2 | 15 million at 1.18% | |
| Roll 3 | 26 million a 1.30% | |
| | | Sales & Roll = 100 million |
| | Buyers | |
| LF Buyer | $100 million | at highest bid rate possible (here 1.31%) |
| Buy 1 | 25 million at 1.31% | |
| Buy 2 | 12 million at 1.28% | |

In this scenario, 29 million must change hands. Buyers who placed in roll positions desire to acquire 71 million and new buyers (buy 1, buy 2) desire to grab a new 37 million.

Since the roll bids and the buy bids total more than the single issue volume (i.e. 100 million), the contractual bidder is not needed and the LF bid is discarded. The single issue is then distributed as:

| Roll 1 | 30 million at market rate | bid value 5 |
| Roll 2 | 15 million at 1.18% | bid value 1 |
| Roll 3 | 26 million a 1.30% | bid value 3 |
| Buy 1 | 25 million at 1.31% | bid value 4 |
| Buy 2 | 12 million at 1.28% | bid value 2 |

Each bid is given a rank value by the software from the lowest interest rate deemed to be a higher value bid (here roll 2 bid at 1.18%) to the highest rate. In this case, since the orders total 108 million, only the roll 1 order will not be fully satisfied and will be given 22 out of the 30 million of the single issue. In this case, the minimum interest rate of the single issue that allows for each of these five bidders to receive their respective portions of the single issue is 1.31%. The market rate is then fixed at 1.31% also known as clearing rate. While investors named roll 2, roll 3, and buy 2 agreed to get the single issue at a lower rate, they will be happy to receive the clearing rate of 1.31%. The highest market bid rate entered by any bidder is taken as the rate of the contractual bidder.

Example 4

In the same setting as example 3 but buyer 2 has decided not to take part in the periodic bidding process. The table becomes:

| 100 MILLION ISSUE | | |
| --- | --- | --- |
| Sales | | Total: 29 million |
| Seller 1 | 10 million | |
| Seller 2 | 19 million | |
| Roll Positions | | Total: 71 million |
| Roll 1 | 30 million at market rate | |
| Roll 2 | 15 million at 1.18% | |
| Roll 3 | 26 million a 1.30% | |
| | | Sales & Roll = 100 million |
| Buyers | | |
| LF Buyer | $100 million | |
| Buy 1 | 25 million at 1.31% | |

| Roll 1 | 30 million at market rate | bid value 4 |
| Roll 2 | 15 million at 1.18% | bid value 1 |
| Roll 3 | 26 million a 1.30% | bid value 2 |
| Buy 1 | 25 million at 1.31% | bid value 3 |
| LF Buy | $100 million | bid value 5 |

The total demand from investors is only for 96 million of the 100 million single issue. The contractual bidder's bid will then be needed to acquire 4 of the 100 million who will then be placed on the secondary offering market at the clearing rate. Once again, the clearing rate is calculated as the lowest rate possible to satisfy all orders (i.e. the 96 million). In this case, the clearing rate will also be 1.31%. While under the B-VRDO's terms, the contractual bidder will be given an effective rate higher than 1.31% for holding the 4 million in the single issue, the secondary market will list these financial instruments available for that rate. FIG. 10 shows in a table format with more detail the different bids according to an embodiment of the present disclosure.

Bid Activity Screen

A commercial platform can be customized and programmed to be made to include many of the known functions and tools in the trading area. For example, the different instruments listed in the competitive bidding platform can be listed using calendar functions, bond numbering reference numbers like the Committee on Uniform Securities Identification Procedures (CUSIP) numbers, a name of the issue, a size of the issuance of the debt, dates and rates associated with the issue, ratings and the name of a clearing bank for the bond, the name of the contractual bidder associated with the issue, the number of holders, the volume of trade, a history of trade, and the volume and size of the outstanding bid for any given upcoming competitive bidding.

Other tools given in the competitive bidding platform can include account names and account numbers of portfolios, management of portfolio tools, the type and history of any given bond holding, the rate of the financial instruments, and a full interface to manage any given trade or option associated with the trade. In the field of trading, what is known and is the use of a wide range of tools to help investors research, and trade instruments.

FIG. 11 shows an image of the 'bid activity' screen 900 of the biddable online software interface. This screen allows a bidder to see each deal that will reset with the periodic expiration relevant to the trader, for example for the day. As shown, the screen shows all the financial instruments including those not owned by the investor. Bids can be entered using "bid all" or "sell all" actions, a summary of a security master and/or a security rate history data can be seen. This screen keeps the user informed of owned positions in the reset, to let them know if the bid entered is 'out of the money' (i.e. other lower interest rates are entered to such a value that upon predictions, the entered bid would not be fulfilled). This allows the investor to amend the bid to a new interest rate if he/she desires to get the security.

In the screen 900 of a dashboard to help manage the transactions over the online competitive bidding platform for different securities, for example at 907 either B-VRDOs or B-TOBs. In this illustration, there is a list of a number of investment opportunities listed using normal selection tools. Each investment opportunity shown on a line, information regarding different elements are listed in respective columns. While these attributes are listed, what is contemplated is the use of any number of columns to give in a single view all information needed to help manage and select biding options over the platform.

Each investment opportunity or single issue normally includes a CUSIP number 903 and a name 904 each with a dynamic link that can be enabled with a user click to go into a specific page for the security. In the case of most bonds the name of the issuer is a key element in the stability of the bond. In the example given at FIG. 11, the name of the issuer is listed 904. As shown, both the CUSIP and the issuer name 903, 904 are underlined and are dynamically connected using a link with a page. While one type of secondary data is shown, what is contemplated is the use of any interface to help provide an investor with data to help guide and manage portfolio assets and bid on investment opportunities.

Since FIG. 11 illustrates all of the financial instruments to be reset on a given day, the reset date 902 is the same for every biddable financial instrument. Next, at 905, a time during the day when the deadline for the last bid will be entered is given (see below for the different dates and deadlines). In the examples given above, the reset date is generally less than a week in the future for B-VRDOs who reset interest rates on a weekly basis. The frequency of reset of a rate on any B-VRDO is set in the bond document and can be weekly, bi-weekly, monthly or any other desired period. A deadline on the reset date for bidding is given 905. As explained above, this deadline may not be the tender deadline or the deadline when a roll over position must be entered, in the context the deadline represents the maximum time in which a potential new bidder may enter a bid to acquire a new position in the single issue.

Next is listed the current rate 906 at which the instrument pays interest, this rate is generally given as the clearing rate calculated using the above calculation. This rate is generally expressed in percentage over one year. In the examples given, the rates listed are close to 0.2% but one of ordinary skill in the art will understand that the interest value of bonds is subject to change over time and reflects other market conditions. As shown, the current rate 906 can also be underlined and/or colored in blue to indicate that a user of the interface can click on the value to obtain a breakdown of information associated with this number. For example, information regarding past rates and trends or expert evaluations and estimations. A colored arrow helps illustrates the trend of the current rate 906, in one embodiment the arrow represents the variation week over week of the current rate. In other embodiments, the arrow is a four week moving average or any other type of useful indicator to help give a potential investor an indication of the recent evolution of the current rate 906.

Listed as 907 is the type of security. For example a Tender Option Bond (TOB), a Variable Rate Demand Obligation (VRDO) where both are made biddable and are respectively called Biddable-TOB or Biddable-VRDO (BTOB or BVRDO) and can be transacted on the platform. While a handful of investments are listed, others are contemplated.

The B-MLVRS or the biddable MLVRS is a floating-rate debt instrument with intermediate to long-term final maturities with a rate typically reseat on a 7, 14, 28 or 35 day period also as a multimodal securities with a maximum rate in market-liquidity failure mode of 8.00%, a bond failure of 12 months continuous, and an acceleration of maturity to intermediate range (i.e. 5 years from 30 years). In case of a successful bid process during a fail cycle, maturity can as explained above revert back to the 30 years initial maturity. In this case, the contractual bidder is a takeout for the bondholder. In case of lack of market liquidity the B-MLVRS enter a liquidity failure mode where sellers must hold positions and wait until next reset to attempt to sell at par. The B-MLVRS reset at maximum rate until successful bid process and redeem at maturity.

Finally the B-TOB or the biddable TOB are floating rate put deals that reset every 7 days much like B-VRDOs but where they are leveraged trade where a trust sponsor buys an intermediate/long-term bond into a trust. The B-TOB is wrapped with short-term liquidity, the trust pays out variable interest to money market investors while taking a long term coupon payments from the underlying bond. The spread differential is kept by the trust sponsor of the underlying bond. The spread differential is usually magnified by the use of leverage. These are also 2a-7 money market eligible with a reset period generally not to exceed 397 days.

Given as 910 and 911 are index scores from different known institutions, such as Moody's® and S&P®. These scores are generally useful to help guide a potential investor to different types of bonds and/or make sure certain minimum ratings are maintained for every asset purchased as part of a portfolio. Once again, while some tools are shown, what is contemplated is the use of any tool useful for any investor in the selection and evaluation of any investment instrument.

As part of the new biddable financial instrument, at the time of creation of the instruments, conditions are created and added to these new instruments like 912 a ceiling rate associated with the instrument. This ceiling rate is defined as the maximum interest rate that a financial institution can charge a borrower for an adjustable rate mortgage or loan according to the contractual terms of the mortgage or loan. This interest rate is expressed as an absolute percentage. For example the ceiling rate as shown at FIG. 11, can be in the 9-12%. Safeguards are placed into the platform to make sure that the current rate never passes the ceiling rate.

Next is shown as 913 an All Sell Rate (ASR) also defined as part of certain biddable financial instrument. In one embodiment, the inventor contemplates the ASR to be calculated as the lower of: (a) the previous week's reset rate (for example the current rate 906) plus a fixed value such as 100 basis points (1.00%), or (b) a quarter of the ceiling rate. As a consequence of fixing the ARS, this allows the contractual bidder to receive as a compensation for acting in this capacity at least 100 basis point over the current rate, with a minimum of a fixed value off the ceiling rate (i.e. in the above examples, the contractual bidder will make at least the largest of 2.5% or 1% above the current rate). This feature is unique to the biddable platform.

Example 5

A first B-VRDO has a current rate of 0.200% and a ceiling rate of 10% as defined in the bond document. The ARS would be calculated as the larger of 1.200% (the current reset plus 100 basis points) and 2.500% (a quarter of 10% ceiling rate) so in this case the ASR would be set at 2.500%.

Example 6

A second B-VRDO has a current rate of 2.200% and a ceiling rate of 10% as defined in the bond document. The ARS would be calculated as the larger of 3.200% (the current reset plus 100 basis points) and 2.500% (a quarter of 10% ceiling rate), so in this case the ASR would be of 3.200%.

While one formula is described (i.e. 25% of the ceiling rate and 100 basis points), what is contemplated is the use of other values or limits, for example 20% of the ceiling rate and 50 basis points. The determination of the ASR offers financial security to the party acting as the contractual bidder as described above, it allows this party to benefit financially when it is forced to acquire issues have to be purchased. It also allows for a rate of interest to be paid that rewards the holder while taking into consideration the past trading conditions and the maximum rate on the instrument.

Any sum paid to the contractual bidder above the clearing market bid rate, or the current rate as determined by the formula will be given as an "additional liquidity fee" or a fee for acting as a liquidity provider. The trustee or a bank will then pay at each period a sum associated with the total issue at the clearing rate to every issue holder including the liquidity provider or contractual bidder at the clearing rate. In case that the ASR is enabled, or that a portion of the issue is held for a short period or a longer period by the contractual bidder, the difference between the current rate and the all ASR will be paid out to the contractual bidder as a liquidity fee and paid directly.

The ASR as described is different than any acceleration clauses built into the B-VRDO where a holder of defaulted bonds will progressively see the rate of interest increase as the position is held until a clause forces the issuer to purchase back the debt at a fixed rate. For example, clauses can be built into a bond where can provide for a holder to receive 50% of the ceiling rate for a fixed period increased by 50 basis points each month until the ceiling rate has been reached. The determination of ASR is in addition to any normal default or other provisions included in the bonds. In one embodiment, acceleration of the bonds happen after a period of six months and will convert the issue into bank bonds.

Returning to FIG. 11, a list of opening positions provides for the current holdings held in the portfolio of the investor using this computer screen. In the example given at FIG. 11, the investor has four positions 909. At 915, an action button allows an investor to take an action either by tendering the existing position, placing a roll of the current position at a fixed new rate, or place of buy order that exceeds the opening position. The platform can react differently to a desire to change the volume of the current position in any investment, for example it can ask if the existing position must be simply rolled and the new exceeding value entered as a secondary bid at a different rate or the platform can be set up to consider a new single bid to replace any previous position. The action button 915 can also simply be a bid button for investment instruments that are not currently held (i.e. the only possible option is one of purchase and entry into the investment instrument).

Once a bid is placed, using the action button 915, it appears under "my bids" 914. Finally a market composite summary table 901 allows a potential or current investor to see the current interest in any given instrument. Only once the new rate is determined and the period has not been reset will the last column be filled with the new rate. The other four columns include the number of outstanding buy orders, the outstanding sell orders, the roll/hold orders and the associated projected final rate if the auction was held immediately.

Allocation of bonds at the current rate or the clearing market bid rate will be allocated in priority to roll orders from current owners, and other portions of the issue will be used to satisfy buy orders from new bidders. Finally, once all external investors have been awarded their issue, the residual portion of the bonds of any given issue will be given to the contractual bidder. In an alternate embodiment, the contractual bidder will not simply receive the portion of the issue at the current rate or the clearing market bid rate but will be given a rate equal to the greater than a formula and the clearing market bid rate.

In cases of Force Majeure, where the trading platform system is down or not available, in one embodiment, the market rate will be automatically reset to a rolling four week average of the current rates for each investment instruments. In case of absolute failure or a dealer failure, the holder will maintain the option to exercise the put and tender the bonds to the contractual bidder regardless of the system failure. For example, if the liquidity provider 908 is Bank of America®, and the system is down, a holder will always be able to call Bank of America® and tender directly the biddable financial instrument.

Bid Mechanics & Timeline

Figure 12:
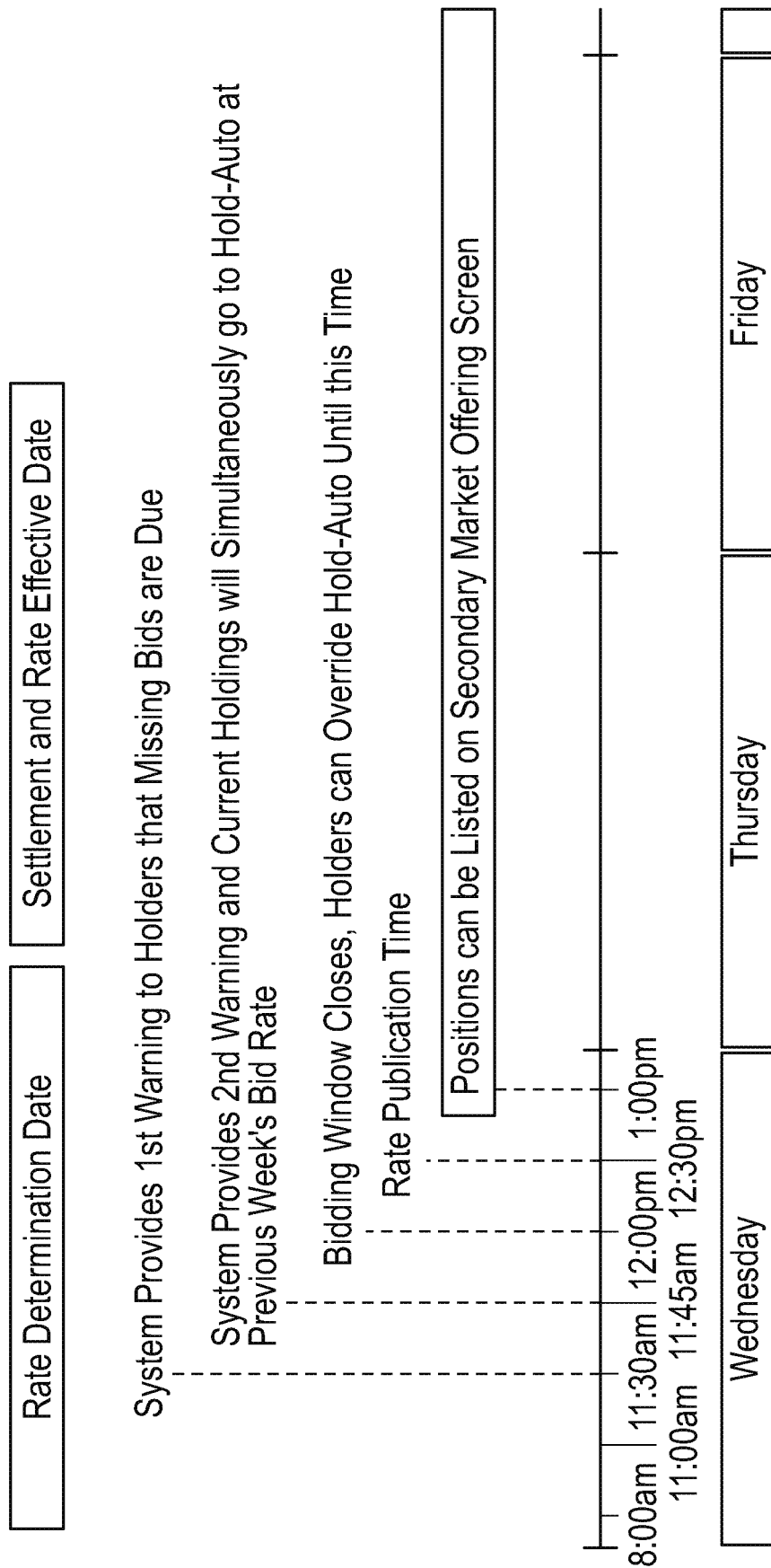
FIG. 12 is a close-up view of the timeline at the time of deadline of entry of bids into the competitive bidding online platform according to an embodiment of the present disclosure.
Figure 13:
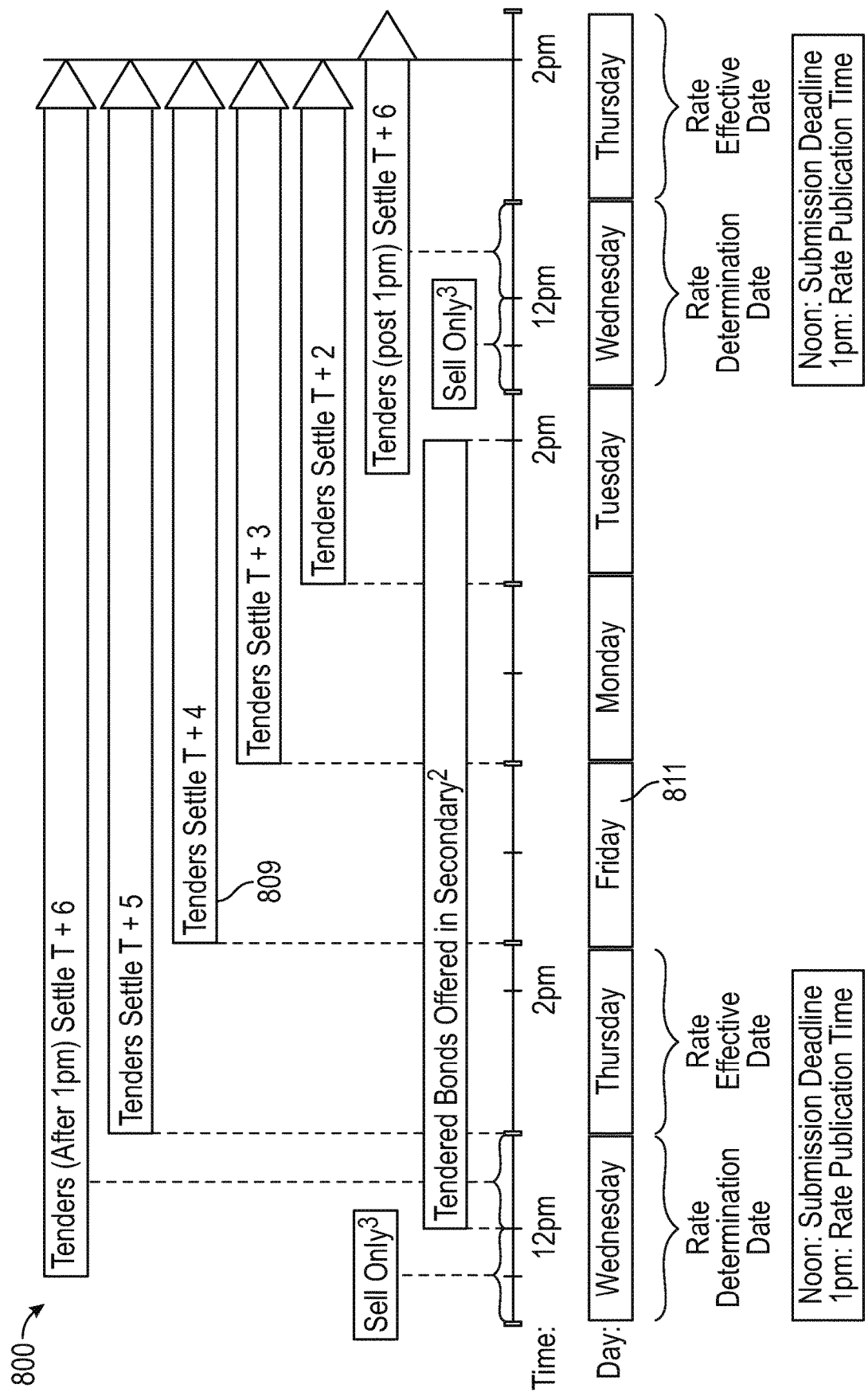
FIG. 13 is a periodic timeline diagram of the tender process associated with the competitive bidding online platform for biddable financial instruments.

FIGS. 12 and 13 offer information as to how the bid mechanics and timeline utilized by the biddable online auction platform. FIG. 12 illustrates with greater detail the different time sensitive elements associated with the bid mechanics. FIG. 13 shows the periodic timeline associate with each cycle.

At FIG. 12, in a morning where the bidding opened at 8 am, the deadline of entry of bids can be for example 11 am on the user's screen. The system can provide a 1st warning. As shown at FIG. 12, this first warning can be 30 minutes after the official time. Fifteen minutes later or at 11:45 am, the system can yet send another warning to holders that their bids if not entered remain outstanding and due and all current holdings will simultaneously go to 'hold-auto' mode at the previous weeks bid rate (i.e. the same order as entered the week before). As shown, at noon the bidding window can close and all holders can override 'auto-hold' until this time. The system and platform then calculates the rates and as early as 12:30 on the day, the new clearing rates can be published. Minutes later (here at 1 pm) the positions can be listed on a secondary market offering screen and the positions held by the liquidity provider can be acquired. As part of this system, the non-availability window of the system for bidding is very short (here 2 hours) before secondary offerings can be purchased.

FIG. 13 is a timeline diagram 800 of a periodic tender process associated with the biddable online auction platform. This diagram is helpful to understand each step of the method associated with the offering for tender, the settlement, and the giving of cash settlements associated with the auction of the different biddable financial instruments traded on the platform. The days of a sample week are listed 811 from Wednesday to the following Thursday.

As described above and illustrated with greater detail at FIG. 12, bids are received Up to a fixed time (here noon) and tendered bonds are shown immediately offered on the secondary offering area. One will understand the description of FIG. 12 when and if conflicting with the simplified version of FIG. 13 will prevail. On a Rate Reset Date (RRD), all bids are then due by noon on the RRD and the calculation of the Reset Rate is then announced on 1 pm on the RRD. This RRD is as shown on the day before the Rate Effective Date (RED) determined by the system. The RED is associated with the interest payment calculation. A holder of an instrument sold on the RDD is considered for the purpose of the calculation of interest to have been the official holder for the day. At FIG. 13, the RED happens to fall on a Thursday and the RRD falls on Wednesday immediately before the RED Thursday. While one embodiment is shown where the RED and the RRD are two consecutive days located at the end of a week, what is contemplated is the use of any day of the week or the week-end where trading is possible for the RED and RRD including the use of nonconsecutive days. What is also contemplated is a system where both the RED and RRD are at different time on the same day. One of ordinary skill in the art will know that currently the settlement dates for bonds and other variable rate instruments is greater than one single day.

On the RRD, tenders 801 received before the drop time of 10 am are then entered into the determination of the rate and then settled on the RED or as shown at T+1 (Time in days+1 day). In the example as shown to help prevent confusion, the platform can refuse to enter tenders at 10 am until a fixed period like 1 pm as shown at 802 where any tender then becomes a trade directed to the next week's settlement. At 802, tenders entered after 1 pm are then settled at T+6 or in one week and a day. During the three hours in the RRD, the rates are reset and calculated using the Dutch Auction method described herein. The portion of the issue that has not been purchased by a normal bidder but instead is taken by the contractual bidder a.k.a. the liquidity provider, is then offered on the secondary market for cash settlements at the time of purchase.

Example 7

Holder A owns one million of the issue at set for the week to an annual rate of 1.400%. The Holder A is part of the primary offering and at this rate, a weekly return may be $270 in interest. Even if Holder A executes the put option, it will see be paid the interest until the tender settles. The interest will be paid to the holder by 2 pm on the RED to the holder. A Holder B buys the same position on the secondary offering on Friday, in this case as shown the tender will settle at T+3 (or will only get a pro-rata fraction of the interest).

As an investor logs into the platform, the investor can see any current holding listed for the current day. In another page, an investor can view all B-VRDO's resetting on a specific date. Bids can be entered on a spread, a percentage, or an absolute yield basis. In one embodiment, bids entered prior to RED cannot be made public and viewed before the day of the RED. In yet another embodiment, bids can be entered on a "good to cancel" basis.

Figure 14:
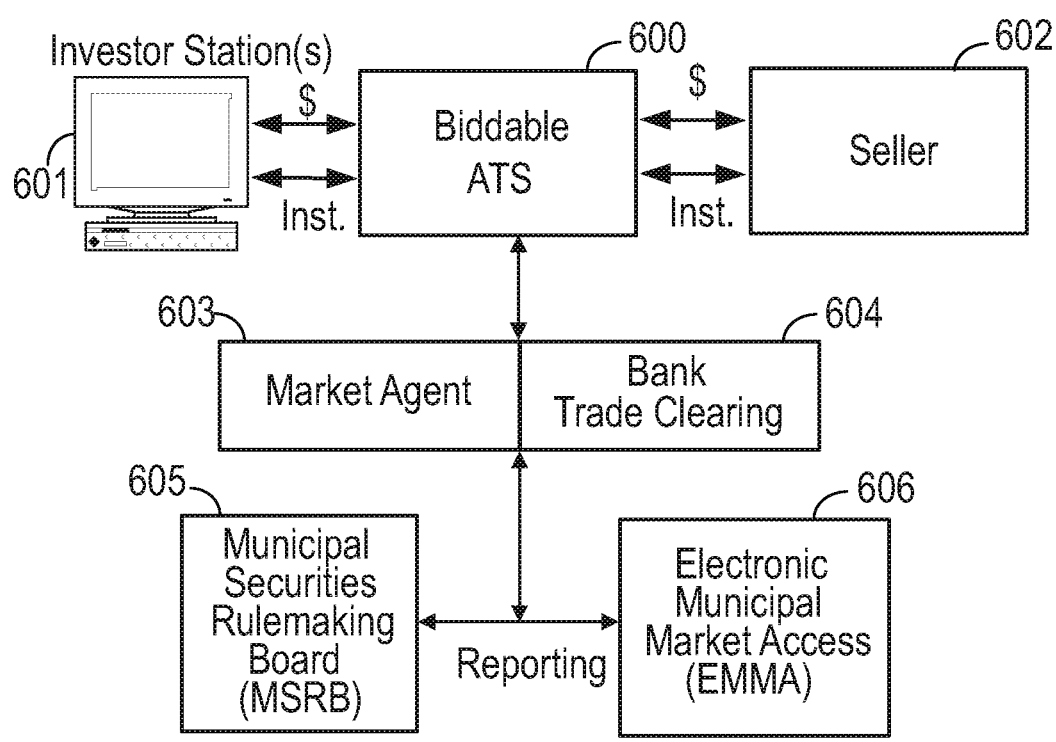
FIG. 14 is a block diagram of the role of the market agent and clearing bank in regards to reporting.

FIG. 14 shows a system for a biddable ATS 600 for example trading B-VRDOs between investors 601 and sellers 602. An exchange of instruments on the biddable ATS is shown. The market agent 603 operating the biddable ATS 600 and/or the clearing bank 604 each can, upon need report to the Municipal Securities Ruleaking Board (MSRB) 605 and/or the Electronic Municipal Market Access (EMMA) 606.

Figure 15:
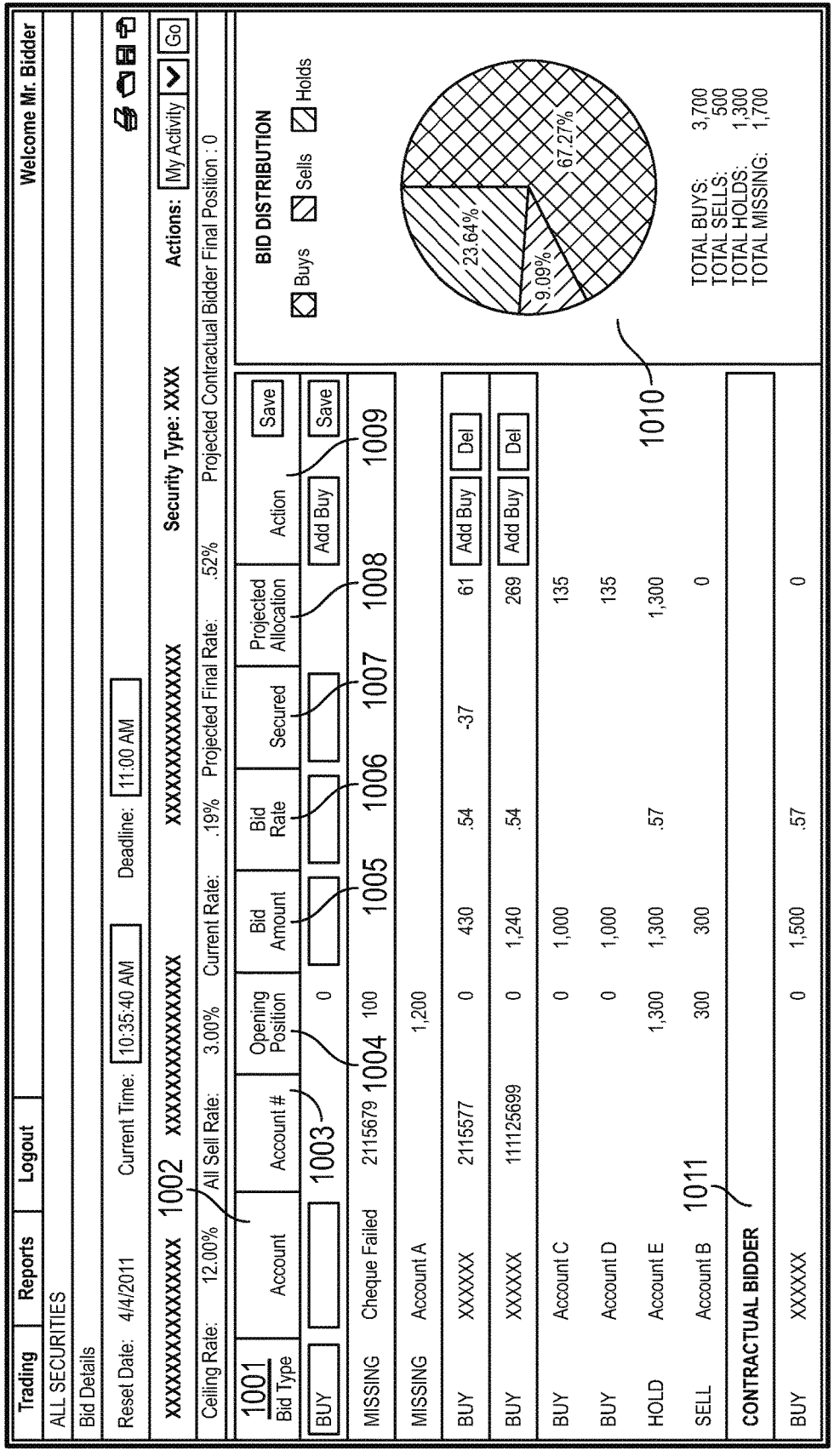
FIG. 15 is one embodiment of a possible display for a bid detail screen.

The placement of individual bids may be facilitated by using a bid detail screen as shown at FIG. 15. In a corner 1010 a bid distribution pie chart allows to view the bid distribution with the total buys, the total sells, and the total holds in a position. As for FIG. 13 a number of columns are suggested. In each line, different positions are listed each with a bid amount 1005, a bid rate 1006, possibly a spread 1007. Associated with a buy order may be an account number 1003, an opening position 1004, and the account label 1002 for each bid type 1001. The contractual bidder 1011 is also listed as a potential bid. In another embodiment, the position/bid is highlighted so a use can see the status of an entire deal. Action buttons 1009 are used to take needed actions for each individual account. Furthermore, dynamic updates are performed as information becomes available.

What is not shown but is contemplated is the use of calendars and rate history screens with graphs to show monthly or yearly trends. The calendar can be used to track numbers of bids and certain issues of interest. Other screens produced by the system include ticketing and trade blotter screens to view trades after they have been saved or as tickets entered into the system. In yet another embodiment, position monitor tools can be used to help monitor results of searches for specific types of securities in the platform. A customized tool allows to ran reports and manage tickets entered into the system.

What is described above is a online competitive bidding platform 100 as shown generally at FIG. 7 for trading biddable financial instruments 7, 20, and 23 hosted on structure shown at FIG. 4 including an network-enabled server 79, the online competitive bidding platform 100 comprising a plurality of user personal computers 11 each with at least a computer processor 75 with a computer memory 76 for executing a software 86 shown at FIG. 5 generally in the computer memory 76 by the computer processor 75, a computer display 77 and interface 77 connected to the computer processor 75, and a computer connection illustrated by arrows to a network 82. The software 86 in each of the computer processors 75 is an investor software interface 86 of a remote competitive bidding software platform 2 as shown at FIG. 5 and at least one network enabled server 79 connected to the network 82 with a server processor 80 and a server memory 81 for executing the competitive bidding software platform 2.

As shown at FIG. 5, the competitive bidding software platform 2 is connected to the investor software interfaces 86 via the network 82 for each of the plurality of personal computers 11 and the competitive bidding software platform 2 includes a clearing rate module 84 for calculation of a clearing rate for a biddable financial instrument for a period. The competitive bidding software platform 2 also includes a multi-party bidding or listing module 87 for accepting bids as shown at FIG. 7 from at least a non-contractual buyer 3, 4 and at least a contractual buyer 22 under contractual obligation to place a bid for the entire issue of the biddable financial instrument.

As described above, biddable financial instrument 7, 20, and 23 at FIG. 7 can be selected from a group consisting of biddable variable rate demand obligations, biddable tender option bonds, and biddable market liquidity variable rate security.

In one embodiment, the investor software interface 86 is an open window on a personal computer of an internet browser connected that operates for example using HTML format and is connected to the network and to a web server. The remote competitive bidding software platform can be a standing alone massive software on a server, multiple servers or a web-based html application for generating information to web-enabled browsers like the investor software interface. The competitive biddable platform can also include a secondary offering module 85 as shown at FIG. 5 for offering biddable financial instruments owned by the contractual bidder for purchase to at least another non-contractual bidder.

In yet another embodiment, what is contemplated is a method for generating a biddable financial instrument for trading over a biddable auction software platform as described above, the method includes the steps of associating within a financial instrument contractual agreement a contractual bidder with a single issue of a financial instrument to be issued by an issuer, using a bank syndicate or an agent to offer the single issue to a plurality of initial investors on a primary market, placing the single issue owned by the initial investors on a biddable alternative trading system, and allowing any of the plurality of investors owning at least a portion of the single issue to trade their positions on the biddable alternative trading system to other investors or to a contractual bidder if no other investor is available to acquire the portion of the single issue.

Alternatively, other further steps can also include allowing the contractual bidder to sell any portion of the single issue in its possession over a secondary offering to investors for the remaining of a period, paying interest for the period to the investors and/or the contractual bidder for their ownership interest in the single issue at a clearance rate and paying to the contractual bidder an additional fee, and making sure the additional fee is the difference between an all-sell-rate and the clearance rate for the period.

Also described above is a method of calculating a premium, or a fee for a contractual bidder holding a position in a biddable financial instrument trading over a competitive bidding software platform, the method comprising the steps of fixing contractually a yearly ceiling rate of an issue of a biddable financial instrument as part of a contractual agreement of the biddable financial instrument, calculating using a clearing rate module of the online trading platform a clearing rate for the issue of the biddable financial instrument for a period, determining using the clearing rate module an all-sell-rate as the lower of a previous period clearing rate plus a fixed value in basis points or a fraction of the yearly ceiling rate in percentage, and removing from the all-sell-rate the current period clearing rate.

Finally, another method described above is for the calculation of a periodic clearing rate of a single issue of biddable financial instrument trading on a competitive bidding software platform, the method includes the steps of allowing during a trade period at plurality of potential investors to enter sell, buy or roll orders on a single issue of a biddable financial instrument, wherein for each buy or roll order includes at least a volume of trade and a bid rate, determining the highest bid rate entered for the trade period, adding all of the volumes entered for each buy and roll orders into a demand, entering a buy order for a total volume of the single issue at the highest bid rate entered on behalf of a contractual bidder, closing the trade period, comparing the demand with the volume of the single issue and in case the demand is inferior to the single issue volume awarding to the contractual bidder the difference between the singe issue volume and the demand and fixing the periodic clearing rate as the bid rate of the highest order entered as a buy or a roll, and comparing the demand with the volume of the single issue and in case the demand exceeds or equals the single issue volume, fixing the periodic clearing rate as the bid rate of the highest rate possible where the volume of the combined volumes of bids having lower bid rates is at least equal to the volume of the single issue. In another embodiment, the method can include the step of allowing during the trade period automatic roll over orders with the previous periods bid rate entered to be entered by the competitive bidding software platform.

It is understood that the preceding is merely a detailed description of some examples and embodiments of the present invention and that numerous changes to the disclosed embodiments can be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A competitive bidding software platform for trading biddable financial instruments encoded in the computer memory of a plurality of user personal computers and the memory of at least one network enabled server for trading biddable financial instruments hosted on an network-enabled server, the competitive bidding software platform comprising:

a plurality of user personal computers each with at least a computer processor with a computer memory for executing a software in the computer memory by the computer processor, a computer display and interface connected to the computer processor, and a computer connection to a network, wherein the software in each of the computer processors is an investor software interface of a remote competitive bidding software platform; and at least one network enabled server connected to the network with a server processor and a server memory for executing the competitive bidding software platform, wherein the competitive bidding software platform is connected to the investor software interfaces via the network for each of the plurality of personal computers, wherein the competitive bidding software platform includes a clearing rate module for calculation of a clearing rate for a biddable financial instrument for a period, wherein the competitive bidding software platform also includes a multi-party bidding module for accepting bids from at least a non-contractual buyer and at least a contractual buyer under contractual obligation to place a bid for the entire issue of the biddable financial instrument, wherein the investor software interface includes a display of a list of positions including at least one opening position of current holdings held in a portfolio of the investor and the competitive bidding software platform to react differently to a desire by the investor to change the volume of a current position in the list of positions between two subsequent periods.

2. The competitive bidding software platform of claim 1, wherein the biddable financial instrument is selected from a group consisting of biddable variable rate demand obligations, biddable tender option bonds, and biddable market liquidity variable rate security.

3. The competitive bidding software platform of claim 1, wherein the investor software interface is an internet browser connected via HTML format to a web server and wherein the remote competitive bidding software platform is a web-based html application for generating information to web-enabled browsers like the investor software interface.

4. The competitive bidding software platform of claim 1, wherein the competitive bidding platform includes a secondary offering module for offering biddable financial instruments owned by the contractual bidder for purchase to at least another non-contractual bidder.

5. The competitive bidding software platform of claim 1, wherein the clearing rate module for calculation of the clearing rate for the biddable financial instrument for the period uses a Dutch auction system for determining the clearing rate.

6. The competitive bidding software platform of claim 5, wherein the clearing rate module assigns a priority of roll orders at the clearing market rate, buy orders at the clearing market rate, and buy orders of the contractual bidder.

7. A method for generating a biddable financial instrument for trading over a competitive bidding software platform, the competitive bidding software platform comprising a plurality of user personal computers each with at least a computer processor with a computer memory for executing a software in the computer memory by the computer processor, a computer display and interface connected to the computer processor, and a computer connection to a network, wherein the software in each of the computer processors is an investor software interface of a remote competitive bidding software platform and at least one network enabled server connected to the network with a server processor and a server memory for executing the competitive bidding software platform, wherein the competitive bidding software platform is connected to the investor software interfaces via the network for each of the plurality of personal computers, wherein the investor software interface includes a display of a list of positions including at least one opening position of current holdings held in a portfolio of the investor and the competitive bidding software platform to react differently to a desire by the investor to change the volume of a current position in the list of positions between two subsequent periods, the method includes the steps of: associating within a financial instrument contractual agreement a contractual bidder with a single issue of a financial instrument to be issued by an issuer; using a bank syndicate or an agent to offer the single issue to a plurality of initial investors on a primary market; placing the single issue owned by the initial investors on a biddable alternative trading system; and allowing any of the plurality of investors owning at least a portion of the single issue to trade their positions on the biddable alternative trading system to other investors or to a contractual bidder if no other investor is available to acquire the portion of the single issue.

8. The method of claim 7, further including the step of allowing the contractual bidder to sell any portion of the single issue in its possession over a secondary offering to investors for the remaining of a period.

9. The method of claim 8, further including the step of paying interest for the period to the investors and/or the contractual bidder for their ownership interest in the single issue at a clearance rate and paying to the contractual bidder an additional fee.

10. The method of claim 9, wherein the additional fee is the difference between an all-sell-rate and the clearance rate for the period.

11. A method of calculating a premium for a contractual bidder holding a position in a biddable financial instrument trading over a competitive bidding software platform comprising a plurality of user personal computers each with at least a computer processor with a computer memory for executing a software in the computer memory by the computer processor, a computer display and interface connected to the computer processor, and a computer connection to a network, wherein the software in each of the computer processors is an investor software interface of a remote competitive bidding software platform and at least one network enabled server connected to the network with a server processor and a server memory for executing the competitive bidding software platform, wherein the competitive bidding software platform is connected to the investor software interfaces via the network for each of the plurality of personal computers, wherein the investor software interface includes a display of a list of positions including at least one opening position of current holdings held in a portfolio of the investor and the competitive bidding software platform to react differently to a desire by the investor to change the volume of a current position in the list of positions between two subsequent periods, the method comprising the steps of:

fixing contractually a yearly ceiling rate of an issue of a biddable financial instrument as part of a contractual agreement of the biddable financial instrument;

calculating using a clearing rate module of the online trading platform a clearing rate for the issue of the biddable financial instrument for a period; and determining using the clearing rate module an all-sell-rate as the lower of a previous period clearing rate plus a fixed value in basis points or a fraction of the yearly ceiling rate in percentage; and removing from the all-sell-rate the current period clearing rate.

12. A method for the calculation of a periodic clearing rate of a single issue of biddable financial instrument trading on an biddable online trading platform comprising a plurality of user personal computers each with at least a computer processor with a computer memory for executing a software in the computer memory by the computer processor, a computer display and interface connected to the computer processor, and a computer connection to a network, wherein the software in each of the computer processors is an investor software interface of a remote competitive bidding software platform and at least one network enabled server connected to the network with a server processor and a server memory for executing the competitive bidding software platform, wherein the competitive bidding software platform is connected to the investor software interfaces via the network for each of the plurality of personal computers, wherein the investor software interface includes a display of a list of positions including at least one opening position of current holdings held in a portfolio of the investor and the competitive bidding software platform to react differently to a desire by the investor to change the volume of a current position in the list of positions between two subsequent periods, the method includes the steps of:

allowing during a trade period at plurality of potential investors to enter sell, buy or roll orders on a single issue of a biddable financial instrument, wherein for each buy or roll order includes at least a volume of trade and a bid rate; and determining the highest bid rate entered for the trade period; adding all of the volumes entered for each buy and roll orders into a demand; entering a buy order for a total volume of the single issue at the highest bid rate entered on behalf of a contractual bidder; closing the trade period; comparing the demand with the volume of the single issue and in case the demand is inferior to the single issue volume awarding to the contractual bidder the difference between the singe issue volume and the demand and fixing the periodic clearing rate as the bid rate of the highest order entered as a buy or a roll; and comparing the demand with the volume of the single issue and in case the demand exceeds or equals the single issue volume, fixing the periodic clearing rate as the bid rate of the highest rate possible where the volume of the combined volumes of bids having lower bid rates is at least equal to the volume of the single issue.

13. The method of claim 12, further including the step of allowing during the trade period automatic roll over orders with the previous periods bid rate entered to be entered by the competitive bidding software platform.

14. The method of claim 12, wherein the bid rate can be a market rate.

\* \* \* \* \*